(12) United States Patent
Whitney et al.

(10) Patent No.: US 9,245,058 B2
(45) Date of Patent: Jan. 26, 2016

(54) METHOD AND SYSTEM OF HIERARCHICAL METADATA MANAGEMENT AND APPLICATION

(75) Inventors: Benjamin Taylor Whitney, Ottawa (CA); Paul Anthony Reid, Brockville (CA); Edward Joseph Simon, Nepean (CA); Regi Baby Roy, Ottawa (CA); Stephane Roger Daniel Joseph Charbonneau, Manotick (CA)

(73) Assignee: Titus Inc., Ottawa, Ontario, CA (US)

( * ) Notice: Subject to any disclaimer, the term of this patent is extended or adjusted under 35 U.S.C. 154(b) by 673 days.

(21) Appl. No.: 13/311,323

(22) Filed: Dec. 5, 2011

(65) Prior Publication Data

US 2012/0143923 A1 Jun. 7, 2012

Related U.S. Application Data

(60) Provisional application No. 61/419,526, filed on Dec. 3, 2010, provisional application No. 61/437,922, filed on Jan. 31, 2011.

(51) Int. Cl.
*G06F 17/30* (2006.01)

(52) U.S. Cl.
CPC ................................ *G06F 17/30997* (2013.01)

(58) Field of Classification Search
None
See application file for complete search history.

(56) References Cited

U.S. PATENT DOCUMENTS

| | | | |
|---|---|---|---|
| 6,564,263 B1 * | 5/2003 | Bergman et al. | 709/231 |
| 6,874,146 B1 | 3/2005 | Iyengar | |
| 7,283,989 B1 | 10/2007 | Stephens | |
| 7,409,410 B2 | 8/2008 | Potter | |
| 7,483,879 B2 | 1/2009 | Chang et al. | |
| 7,548,927 B2 | 6/2009 | Turner, Jr. et al. | |
| 2003/0172368 A1 | 9/2003 | Alumbaugh et al. | |
| 2004/0001106 A1 * | 1/2004 | Deutscher et al. | 345/838 |
| 2004/0220926 A1 | 11/2004 | Lamkin et al. | |
| 2004/0268240 A1 * | 12/2004 | Vincent, III | 715/513 |
| 2005/0071801 A1 * | 3/2005 | Jesse et al. | 717/100 |
| 2005/0091346 A1 | 4/2005 | Krishnaswami et al. | |
| 2005/0120029 A1 * | 6/2005 | Tomic et al. | 707/100 |
| 2006/0036935 A1 * | 2/2006 | Warner et al. | 715/500 |
| 2006/0047648 A1 * | 3/2006 | Martin | 707/4 |
| 2006/0173864 A1 * | 8/2006 | Dart et al. | 707/100 |
| 2007/0168340 A1 * | 7/2007 | Mahoney et al. | 707/4 |
| 2007/0294282 A1 * | 12/2007 | Cruver | 707/102 |
| 2008/0104032 A1 | 5/2008 | Sarkar | |
| 2008/0172480 A1 * | 7/2008 | Agrawal et al. | 709/221 |
| 2008/0250313 A1 | 10/2008 | Kamdar et al. | |

(Continued)

OTHER PUBLICATIONS

Yen-Chun Lin et al. "A Data Metadata Schema Repository," 7th WSEAS Int. Conf. on Telecommunications and Informatics (Tele-Info '08): Istanbul, Turkey; May 27-30, 2008.

(Continued)

*Primary Examiner* — Alex Gofman
*Assistant Examiner* — Umar Mian
(74) *Attorney, Agent, or Firm* — Byrne Poh LLP

(57) ABSTRACT

A method of metadata management is provided. Metadata associated with information objects is important in the management and classification of electronic information referred to as information objects. A metadata schema structure definition is defined enabling a metadata schema to be applied to the information objects to ensure consistent creation and management of hierarchical metadata across and organization and interoperability between different metadata schemas.

50 Claims, 28 Drawing Sheets

(56) References Cited

U.S. PATENT DOCUMENTS

| | | | |
|---|---|---|---|
| 2008/0263187 A1* | 10/2008 | Casey et al. | 709/223 |
| 2009/0234784 A1* | 9/2009 | Buriano et al. | 706/12 |
| 2009/0235187 A1* | 9/2009 | Kim et al. | 715/760 |
| 2010/0169369 A1* | 7/2010 | Wang et al. | 707/770 |
| 2010/0169758 A1 | 7/2010 | Thomsen | |
| 2010/0205190 A1* | 8/2010 | Morris et al. | 707/758 |
| 2010/0235725 A1* | 9/2010 | Drayton et al. | 715/234 |
| 2010/0250927 A1 | 9/2010 | Bradley et al. | |
| 2011/0004897 A1* | 1/2011 | Alexander et al. | 725/32 |
| 2012/0197945 A1* | 8/2012 | Huch | 707/803 |

OTHER PUBLICATIONS

International Search Report in International Patent Application No. PCT/CA2011/001321, filed Dec. 5, 2011, mailed Mar. 6, 2012.

Written Opinion in International Patent Application No. PCT/CA2011/001321, filed Dec. 5, 2011, mailed Mar. 6, 2012.

International Preliminary Report on Patentability dated Jun. 4, 2013 in International Patent Application No. PCT/CA2011/001321.

\* cited by examiner

```xml
<?xml version="1.0" encoding="utf-16"?>
<Schema Namespace="http://www.titus.com/schema/" NamespacePrefix="m">
  <License>
    <Company>ACME</Company>
    <LicenseKey>J1yjTF41iBFl6eB</LicenseKey>
  </License>
  <LanguageSettings>
    <AlternateLanguages>
      <Language>es</Language>
    </AlternateLanguages>
  </LanguageSettings>
  <InteropSettings>
    <Interops>
      <Interop Provider="TitusCorp" />
    </Interops>
  </InteropSettings>
  <Fields>
    <Field ID="Security" Type="Group" ValueSource="PredefinedValues" select-multiple="0" required="0" min-selections="0" max-selections="">
      <Text xml:lang="">Security</Text>
      <Text xml:lang="es">Seguridad</Text>
      <Interops>
        <Interop Provider="TitusCorp">Security Level</Interop>
      </Interops>
      <Description xml:lang="">Security is a combined measure of Classificaiton and Business Risk</Description>
      <Description xml:lang="es">La seguridad es una medida combinada de Classificaiton y Riesgos de Negocios</Description>
      <Values />
      <Views>
        <View ID="Test" Visible="1" />
      </Views>
```

*Figure 14*

```xml
<Conditional Mode="Default" />
  <Fields>
    <Field ID="Classification" Type="List" ValueSource="PredefinedValues" select-multiple="0" required="0" min-selections="0" max-selections="">
      <Text xml:lang="">Classification</Text>
      <Text xml:lang="es">Clasificación</Text>
      <Interops>
        <Interop Provider="TitusCorp">Classification</Interop>
      </Interops>
      <Description xml:lang="">The importance of the information to our business</Description>
      <Description xml:lang="es">La importancia de la información para nuestro negocio</Description>
      <Values>
        <Value ID="Secret">
          <Text xml:lang="">Secret</Text>
          <Text xml:lang="es">Secreto</Text>
          <Desc xml:lang=""></Desc>
          <Desc xml:lang="es"></Desc>
          <Interops>
            <Interop Provider="TitusCorp">Classified High</Interop>
          </Interops>
          <Conditional Mode="Default" />
        </Value>
        <Value ID="Confidential">
          <Text xml:lang="">Confidential</Text>
          <Text xml:lang="es">Confidencial</Text>
          <Desc xml:lang=""></Desc>
          <Desc xml:lang="es"></Desc>
          <Interops>
            <Interop Provider="TitusCorp">Classified Medium</Interop>
          </Interops>
          <Conditional Mode="Default" />
        </Value>
        <Value ID="General Business">
          <Text xml:lang="">General Business</Text>
          <Text xml:lang="es">General de Negocios</Text>
          <Desc xml:lang=""></Desc>
          <Desc xml:lang="es"></Desc>
          <Interops>
            <Interop Provider="TitusCorp">Classified Low</Interop>
          </Interops>
          <Conditional Mode="Default" />
        </Value>
        <Value ID="Personal">
          <Text xml:lang="">Personal</Text>
          <Text xml:lang="es">Personal</Text>
          <Desc xml:lang=""></Desc>
          <Desc xml:lang="es"></Desc>
          <Interops>
            <Interop Provider="TitusCorp">Unclassified</Interop>
          </Interops>
          <Conditional Mode="Default" />
        </Value>
      </Values>
      <Views>
        <View ID="Test" Visible="1" />
      </Views>
      <Conditional Mode="Default" />
      <Fields>
```

*Figure 14a*

```
<Field ID="BussinessRisk" Type="List"
ValueSource="DynamicValueProvider" select-multiple="0" required="0"
min-selections="0" max-selections="">
        <Text xml:lang="">Bussiness Risk</Text>
        <Text xml:lang="es">Riesgos del Negocio</Text>
        <Interops>
          <Interop Provider="TitusCorp">BusinessRisk</Interop>
        </Interops>
        <Description xml:lang="">Risk to the business is this
information is improperly disclosed</Description>
        <Description xml:lang="es">Riesgo para el negocio es esta
información se divulguen indebidamente </Description>               ⎫ 1502
        <DynamicValueProvider ID="AD"
DynamicValueIDSource="MappedValue" IncludeUnmapped="1">
   <Mappings>
          <DynamicMapping Static="1" MappedValue="High" />
          <DynamicMapping Static="1" MappedValue="Medium" />
          <DynamicMapping Static="1" MappedValue="Low" />
          <DynamicMapping DynamicValue="Unclassified"
MappedValue="Public" />
          <DynamicMapping DynamicValue="CUI"
MappedValue="Controlled Unclassified Information" />
   </Mappings>
          <Param ID="Domain" Value="Titus.local" />
          <Param ID="GlobalCatalog" Value="Yes" />
          <Param ID="Attribute" Value="BusinessRISK" />
        </DynamicValueProvider>
        <Values>
          <Value ID="High">
            <Text xml:lang="">High</Text>
            <Text xml:lang="es">Alto</Text>
            <Desc xml:lang=""></Desc>
            <Desc xml:lang="es"></Desc>
            <Interops>
              <Interop Provider="TitusCorp">Level 1</Interop>  ⎫ 1504
            </Interops>
            <Conditional Mode="ConditionalParentValue">
              <Values>
                <Value>Secret</Value>
                <Value>Confidential</Value>
                <Value />
              </Values>
            </Conditional>
          </Value>
```

*Figure 15*

```xml
<Value ID="Medium">
  <Text xml:lang="">Medium</Text>
  <Text xml:lang="es">Medio</Text>
  <Desc xml:lang=""></Desc>
  <Desc xml:lang="es"></Desc>
  <Interops>
    <Interop Provider="TitusCorp">Level 2</Interop>
  </Interops>
  <Conditional Mode="ConditionalParentValue">
    <Values>
      <Value>General Business</Value>
      <Value />
    </Values>
  </Conditional>
</Value>
<Value ID="Low">
  <Text xml:lang="">Low</Text>
  <Text xml:lang="es">Bajo</Text>
  <Desc xml:lang=""></Desc>
  <Desc xml:lang="es"></Desc>
  <Interops>
    <Interop Provider="TitusCorp">Level 3</Interop>
  </Interops>
  <Conditional Mode="ConditionalParentValue">
    <Values>
      <Value>General Business</Value>
    </Values>
  </Conditional>
</Value>
```

1502a (annotation pointing to the boxed Conditional block)

*Figure 15a*

```xml
<Value ID="Public">
    <Text xml:lang="">Public</Text>
    <Text xml:lang="es"></Text>
    <Desc xml:lang=""></Desc>
    <Desc xml:lang="es"></Desc>
    <Interops>
      <Interop Provider="TitusCorp"></Interop>
    </Interops>
    <Conditional Mode="Default" />
  </Value>
  <Value ID="Controlled Unclassified Information">
    <Text xml:lang="">Controlled Unclassified Information</Text>
    <Text xml:lang="es"></Text>
    <Desc xml:lang=""></Desc>
    <Desc xml:lang="es"></Desc>
    <Interops>
      <Interop Provider="TitusCorp"></Interop>
    </Interops>
    <Conditional Mode="Default" />
  </Value>
 </Values>
 <Views>
   <View ID="Test" Visible="0" />
 </Views>
 <Conditional Mode="ConditionalParentValue">
   <Values>
     <Value>Secret</Value>
     <Value>Confidential</Value>
     <Value>General Business</Value>
   </Values>
 </Conditional>
 <Fields />
       </Field>
      </Fields>
     </Field>
    </Fields>
   </Field>
  </Fields>
  <ViewSettings>
   <Views>
    <View ID="Test" />
   </Views>
  </ViewSettings>
</Schema>
```

*Figure 15b*

METHOD AND SYSTEM OF HIERARCHICAL METADATA MANAGEMENT AND APPLICATION

CROSS-REFERENCE TO RELATED APPLICATIONS

This application claims priority from U.S. Provisional Patent Application No. 61/419,526 filed Dec. 3, 2010 and U.S. Provisional Patent Application No. 61/437,922 filed Jan. 31, 2011, each of which is hereby incorporated by reference herein in its entirety.

TECHNICAL FIELD

The present disclosure relates to metadata associated with information objects and in particular to the creation and management of hierarchical metadata schemas to be applied to the information objects.

BACKGROUND

The need for rich metadata is necessitated by the growth of data loss, Government regulation, application of new access control methodologies and the need to have policy based decisions on information management. The current state of the art solution using limited Name Value Pairs leads to organizations having to scan the content and in turn guess to a large extent the sensitivity of the document. As well, the document format itself may not be conducive to scanning since it may be in a non-parsable binary form or encrypted in some way.

The sharing of information across company departments, with partners and governmental bodies requires that the metadata associated with the information be consumable by the recipient in a form they are expecting. This includes:
  Native language of recipient
  Metadata schema expected by the recipient
  Data format of the metadata when received by recipient
  The applicability of portions of metadata schema may be influenced by values already associated with hierarchical assigned values, dynamically provided values and the context of the metadata values.
  The totality of a system wide metadata schema may not be applicable to every application of the schema.

Metadata itself is often described as data about data. The metadata schema is the fundamental representation of the relationships amongst the metadata items, the associated values, the context the metadata is applied to and the inherent operational characteristics intrinsically applied within the schema. The ability to manage, classify and organize this data is becoming increasingly complex with the exponential growth of data available.

Accordingly, methods and systems that enable hierarchical metadata management remain highly desirable.

BRIEF DESCRIPTION OF THE DRAWINGS

Further features and advantages of the present disclosure will become apparent from the following detailed description, taken in combination with the appended drawings, in which:

FIGS. 14 & 15 provide representation of a sample XML metadata schema;

It will be noted that throughout the appended drawings, like features are identified by like reference numerals.

DETAILED DESCRIPTION

Figure 1:
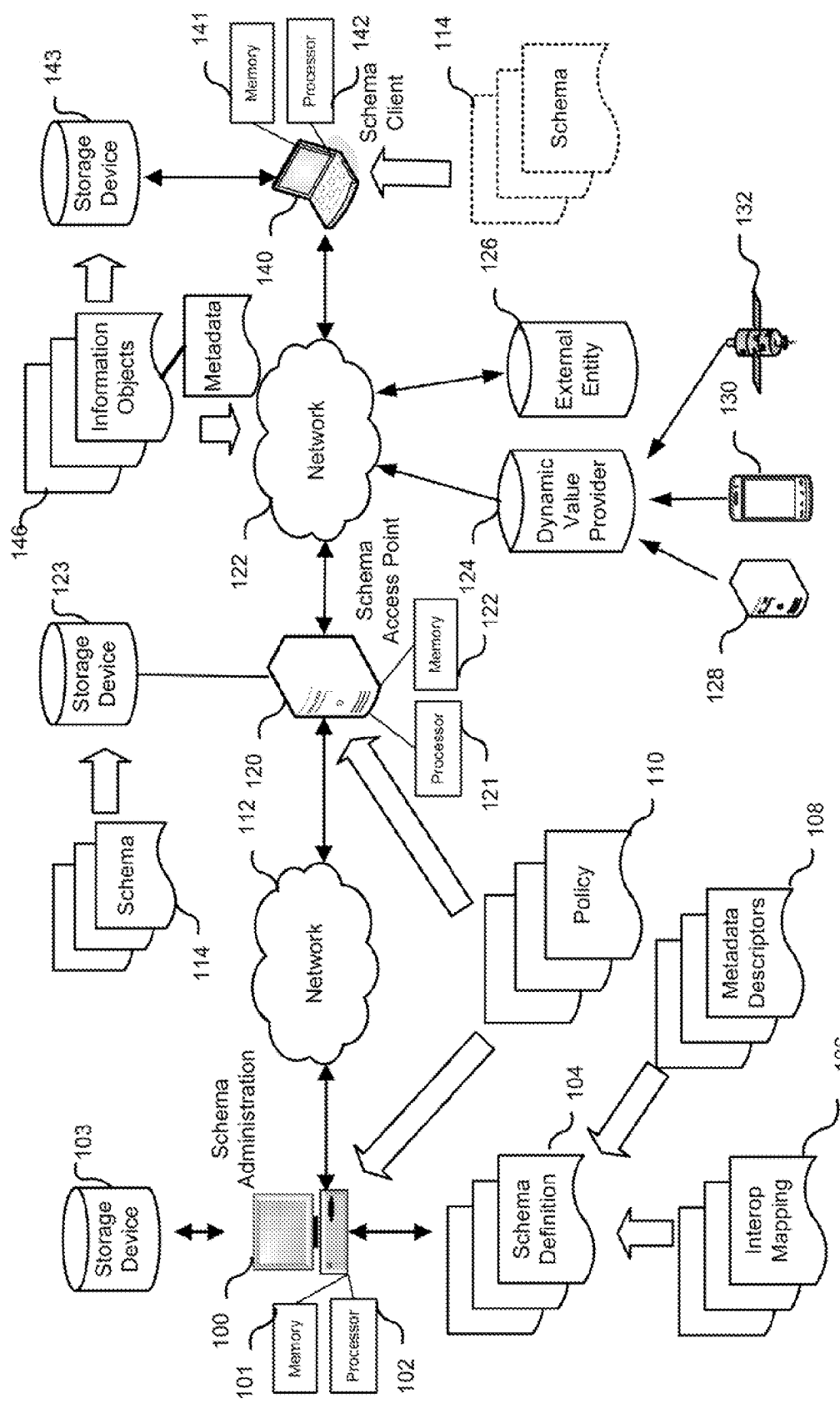
FIG. 1 shows a system representation of hierarchical metadata management and application.

Embodiments are described below, by way of example only, with reference to FIGS. 1-25.

In accordance with an aspect of the present disclosure there is provided a method of metadata management which when executed by a processor comprising determining metadata descriptors and metadata constraints of one or more types of information objects stored in a memory; determining a metadata schema structure definition comprising a plurality of metadata descriptors and relationships between one or more of the plurality of metadata descriptors from the determined metadata descriptors and metadata constraints to be used to define metadata for the one or more types of information objects; determining an interoperability definition of one or more of the plurality of metadata descriptors, associated metadata values and a serialization definition to enable interchange with an external metadata schema format; generating a metadata schema including interoperability mappings in a structured definition language using the metadata schema structure definition and the determined interoperability definition; and storing the metadata schema to the memory.

In accordance with another aspect of the present disclosure there is provided A computer-readable medium containing computer-executable instructions that, when executed by a processor, cause the processor to perform a method for metadata management, the method comprising determining metadata descriptors and metadata constraints of one or more types of information objects stored in a memory; determining a metadata schema structure definition comprising a plurality of metadata descriptors and relationships between one or more of the plurality of metadata descriptors from the determined metadata descriptors and metadata constraints to be used to define metadata for the one or more types of information objects; determining an interoperability definition of one or more of the plurality of metadata descriptors, associated metadata values and a serialization definition to enable interchange with an external metadata schema format; generating a metadata schema including an interoperability mapping in a structured definition language using the defined metadata schema and the determined interoperability definition; and storing the metadata schema to the memory.

In accordance with yet another aspect of the present disclosure there is provided a method of metadata management stored in a computer readable memory, the method executed by a processor coupled to the memory, the method comprising: determining information object type of an information object; receiving metadata schema in response to a request based upon the information object type, the metadata schema comprising a plurality of metadata descriptors and associated constraints associated with the information object; parsing received plurality of metadata descriptors and metadata constraints defined in the metadata schema to determine valid metadata values for the information object type; determining metadata descriptor values to be associated with the received metadata descriptors from the information object; and storing the determined metadata descriptor values.

In accordance with yet another aspect of the present disclosure there is provided a computer-readable medium containing computer-executable instructions that, when executed by a processor, cause the processor to perform a method for metadata management, the method comprising determining information object type of an information object; receiving metadata schema in response to a request based upon the information object type, the metadata schema comprising a plurality of metadata descriptors and associated constraints associated with the information object; parsing received plurality of metadata descriptors and metadata constraints defined in the metadata schema to determine valid metadata values for the information object type; determining metadata descriptor values to be associated with the received metadata descriptors from the information object; and storing the determined metadata descriptor values.

In accordance with yet another aspect of the present disclosure there is provided a method of metadata management at a schema access point executed by a processor, the method comprising: receiving a request from a client computing device identifying an information object type; determining an identity associated with the client computing device and associated security and configuration parameters; determining applicable metadata schema in a structured definition language for information object type from a plurality of metadata schema based on the security and configuration parameters; generating a client metadata schema using the applicable metadata schema and the determined security and configuration parameters; and sending the client metadata schema to the client computing device for application of the client metadata schema to information objects of the object type.

In accordance with yet another aspect of the present disclosure there is provided a computer-readable medium containing computer-executable instructions that, when executed by a processor, cause the processor to perform a method for metadata management at a schema access point, the method comprising: receiving a request from a client computing device identifying an information object type; determining an identity associated with the client computing device and associated security and configuration parameters; determining applicable metadata schema in a structured definition language for information object type from a plurality of metadata schema based on the security and configuration parameters; generating a client metadata schema using the applicable metadata schema and the determined security and configuration parameters; and sending the client metadata schema to the client computing device for application of the client metadata schema to information objects of the object type.

Some aspect of the present disclosure are to provide a methodology and system to build a rich metadata schema that can represent the entire business process of an entity to meet internal and external needs. The metadata schema will also reflect the attributes of the information objects. Intelligence in the design and application of the metadata schema is provided to facilitate information security, access control and interoperability of any information resource or information type. The metadata schema structure definition enables dynamic interchange of metadata labels and values between native languages, schemas and information formats and provides a new metadata paradigm to describe the metadata relationships between individual metadata entries and the information it is describing. The end consumer of the metadata can then have an intelligent and bounded way to supply values for the needed metadata elements. The ability to display intelligent views of the complete metadata schema to end consumers that are applicable to their role or the information they are labelling is facilitated by the dynamic metadata schema structure definition. In addition by defining a structure for application of metadata to information objects, malicious or inadvertent data loss can be stopped. The association of this metadata allows for the information to be controlled, monitored and stored in such a way to prevent the data loss from happening. The present disclosure addresses these issues by providing an intelligent metadata system for the association of metadata to information objects, ranging for electronic documents to physical objects having an electronic representation in a computing environment. By doing this, governmental regulation, internal audit and proprietary information can be controlled and kept confidential.

In addition with organizations applying their own metadata schemas to information objects, the metadata schema structure definition discloses enabling information to be securely shared inside and across a company or between companies and suppliers by ensuring that meaningful metadata associated with the information objects are provided and consumable by the end systems. The association of interoperable metadata needs to reflect the native language of the recipient, the metadata schema being used by the recipient and the format of the metadata being used. Recipient language mapping is solved through the mapping of a generic identifier for the metadata item and value. These generic values are then associated with a matching language string for both the metadata label and value. In this way, the native language of the recipient dictates the metadata label that is displayed and the associated value. This provides the ability to author the schema and metadata in one language (the default language) and then provide additional language values. This translation is done seamlessly and does not require end user involvement.

When exchanging information with associated metadata the recipient organization may represent the metadata attached to the information object in a different format. Metadata format differences have in the past prevented the secure sharing of information and have caused data loss. Interoperability is provided between creator and receipt of the information. This interoperability dynamically maps one schema of metadata to another. The use of interop ID allows the metadata schema structure definition to seamlessly and automatically translate the creator's schema to the recipient's schema. While the metadata schemas between recipient and sender can be dynamically mapped, it may be required to provide the metadata associated with an information object in a particular format. The metadata associated with the information object may need to be provided in a proprietary format, or transformed into a different layout or order. To accomplish this, a dynamic mapping capability can be associated to an interop ID. This way as the metadata schema and values are dynamically transformed for the recipient, the format of the metadata can also be provided in the recipient's native format.

The application of metadata to an information object is a critical part in preventing data loss. The metadata is associated in a way to provide the most accurate representation of the information object. In doing this a user may need to provide additional metadata values based on ones that are previously set. The current metadata systems in use, present the user with a complete list of all possible metadata labels and values, in this way, the user is expected to fully understand the scope, meaning and interrelation of these labels and values. This can lead to inadvertently applying metadata insufficiently to prevent data loss or the contrary, causing the information to have metadata that too strongly restricts its use. To address this the disclosed metadata schema structure definition allows for the application of conditional statements on metadata labels and associated values. These conditional statements would cause additional metadata labels or values to be set, or selectable or not by the user. These conditions allow all of the arithmetic operators and conditional logic to be used in the application of metadata to an information object. With the addition of these labels an end user applying metadata to the information object would be guided in the application of the metadata.

For a company to sufficiently apply metadata to all of the information objects it creates requires the modeling of a very complex metadata schema. The complete metadata schema may not be applicable to every information object or information object type. The applicability to a particular set of metadata schema to prevent the application of all metadata to an information object, this disclosure allows for the creation of schema views that can be assigned to an information object type, these views allow for portions of the overall schema to be applied.

FIG. 1 provides a high level overview of the creation, distribution and consumption of a metadata schema. A user or process, referred to as schema administrator 100, executing on a computer device having for example a memory 101 and a processor 102 in addition to network functionality, describes the collective metadata in terms of descriptors and any constraints associated with the chosen descriptors 108 in a schema structure definition 104. The schema administrator 100 is coupled to one or more computer networks 112 and 122 to deliver schema structure definitions 104 to a schema client 140 that may be executed on a computing device having at least a memory 141 and processor 142 and may be coupled either locally or remotely to a storage device 143 having information objects 146. The computing device may also provide a display and input capability to enable user input in terms of using and manipulating the metadata schema and values of information objects. A schema access point 120 may be provided coupled to one or more of the networks, in this example it is shown between the schema administrator and client, however its relative location is not a limitation. The schema access point 120 may be a network server or computing device having at least a memory 121 and processor 122 and coupled to a storage device 123 either locally or remotely providing metadata schema structure definitions 104 and schemas 114 for executing schema management functions. Although the schema administrator 100, schema access point 120 and schema client 140 are depicted as separate entities the execution of their respective functions may be performed on the same device or distributed between many devices as required.

Metadata descriptors 108 may be related to content or information used to define the information objects 146 or may be related to organizational requirements or functions. The information objects 146 may be any form of electronic data file, or any type of electronic data container containing content or reference external content or devices that may require metadata to be associated with it. The information objects 146 may be stored in one location such as a storage device 143 or may be stored or referenced in many locations in a network based storage environment. The administrator 100 may assign policy restrictions 110 on the schema structure definition 104 in terms of metadata descriptors 108 that can be created and the attributes of those information objects 146, what areas of the schema can be updated, and their ability to publish defined schemas.

The metadata descriptors 108 can have multiple relationships defined as interoperability maps 106 between each other external entities 126 and possible external schema value providers such as computing device or embedded devices 128, mobile devices 130, data providers such as global positioning system 132 or any data source or collection device that may be queried to provide data for input to the metadata values. The defined schema 104 may reference to, or interact with disperative schemas from external entities 126, processes or with schemas that contain different metadata descriptors. These interoperability definitions 106 can also include a serialization definition for the interchange of metadata enabling interoperable schemas. The interoperability is important when information objects are accessible between consumption domains such as between corporate organization or departments. The schemas 114 are generated using a metadata schema structure definition 104 applying a structured definition language that will enable the definition of the metadata schema structure, constraints and any interoperability. The generated metadata schema 114 including all descriptors, constraints and interoperability is stored in a storage device 103. The generated metadata schema 114 contains validation definitions that enable schema validation against stated or implied metadata constraints for the descriptors or the values of the defined metadata descriptors.

When a client or process requires a schema it is 120 retrieved from the 123 published store. The schema 114 may be defined to enable bi-direction exchange of metadata and format of the information object 146 stored in storage device 143 between schema 114 and a schema required by an external entity 126. In defining the schema, there are instances when having a user prove identity through authentication can further enhance the security, non-repudiation, or access to metadata values or to dynamic value providers 124.

The schema structure definition 104 can be defined as a model for the entire metadata definition to generate a schema 114 for an entity such as a corporate organization. As such, views 104 which are parts or subsets of the defined schemas 114 may be made available for consumption based on factors such as information object type, user, role, security level, application, process or other similar needs. The schema 104 can include conditional evaluation of one or more metadata descriptors or their value(s) in deciding to display, evaluate or set metadata descriptors and their associated values. The values predefined in the schema 114 for metadata descriptors do not necessarily have to be static. Values can be provided dynamically from sources that are referenced as providers of values. These dynamic value providers 124, 128, 130, 132 can be of any data type and may also include the dynamic linking of other compatible definitions of metadata descriptors and associated schemas. In turn, static definitions of values for metadata descriptors 108 can as well be specified in the schema structure definition 104.

The complexity of metadata implementations may involve the creation of more than one instance of a metadata descriptors 108. These additional instances of the metadata descriptor will provide cardinality to the schema structure definition and allow from 0 to n instances of that metadata descriptors 108. Once the schema structure definition 104 is created it is published through the schema access point (ScAP) 120 which receives a metadata schema structure definition 123 and associated interoperability mapping. The received schema structure definition is stored in a storage device 123 and may also store schemas 114 generated from the schema structure definition 104. The schema access point 120 will receive a request identifying a type of information object from a client 140 and based on policy 110 and possible authentication of the user, process the applicable metadata descriptors and associated interoperability mapping from the metadata schema based upon the source and type of information object to generate a schema or a schema view to pertain to the information object 146. The schema or view may also define ranges and constraints for information to be stored in the metadata to be associated with the information object 143. Once metadata has been applied to the information objects 143, the metadata can be used for; categorizing, searching, securing, control, access, presentation and modification through various functions in regards to consumption, application and use of the information objects 146 by schema clients 142 or other consumption devices.

Figure 2:
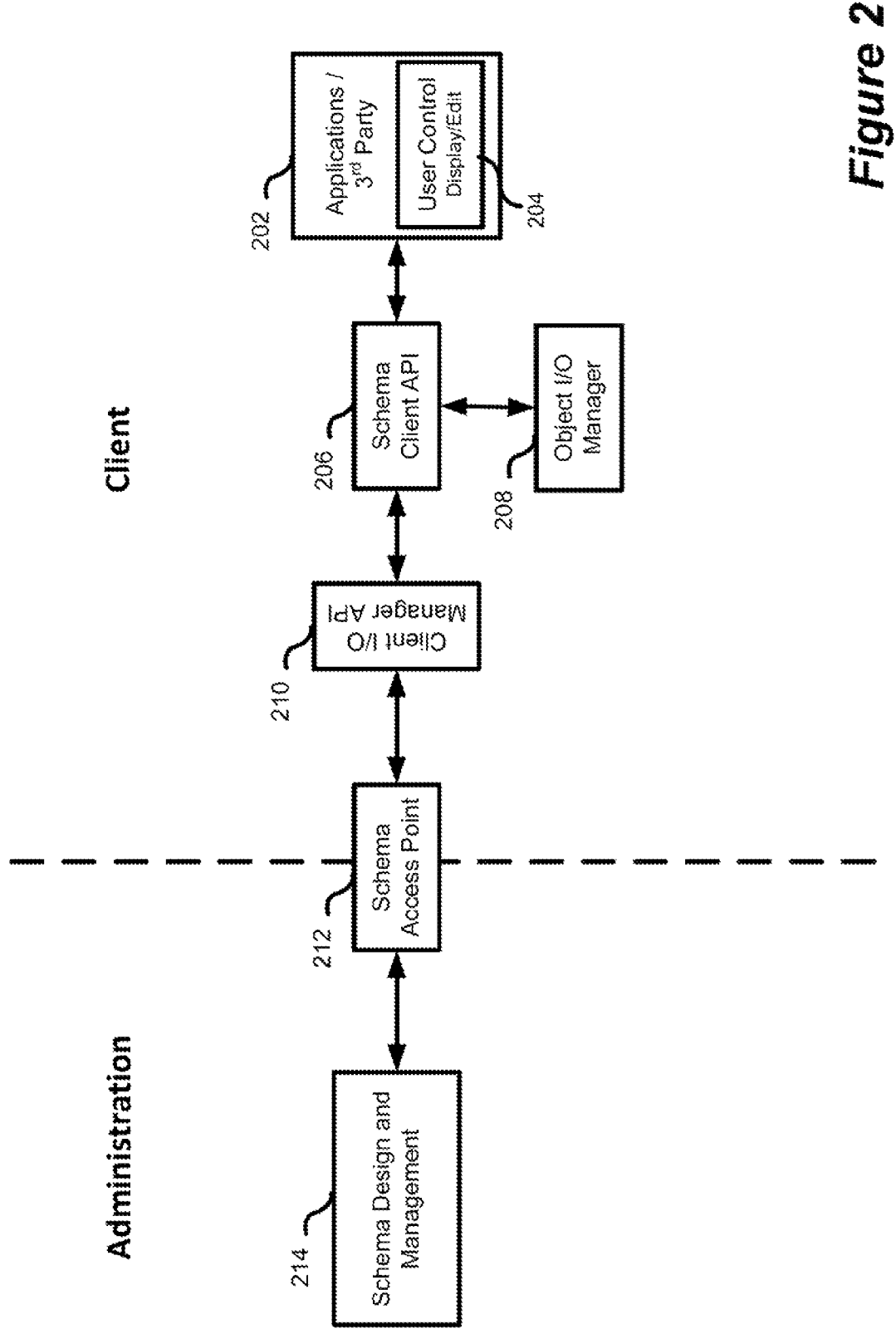
FIG. 2 shows a representation of a metadata infrastructure cycle.

FIG. 2 shows a representation of a metadata infrastructure cycle diagram from creation to consumption. The process begins with schema design and management function 214 provided by the schema administration 100 that are used to design the schema and to eventually publish the schema to schema access point 120 schema access point function 212. The final output of this is a schema structure definition file that describes the metadata infrastructure for the application of metadata to all information objects. When the schema is finalized, schema access point function 212 receives a request to publish the schema for consumption by end users, automated systems, information brokers and other systems that require rich metadata with the information objects on which they operate. The schema access point 212 receives commands from in regards to which schema(s) to publish to the appropriate configured repositories. Schema access point function 212 also responds to requests from client I/O (Input/Output) manager 210 on behalf of schema client API 206.

Figure 3:
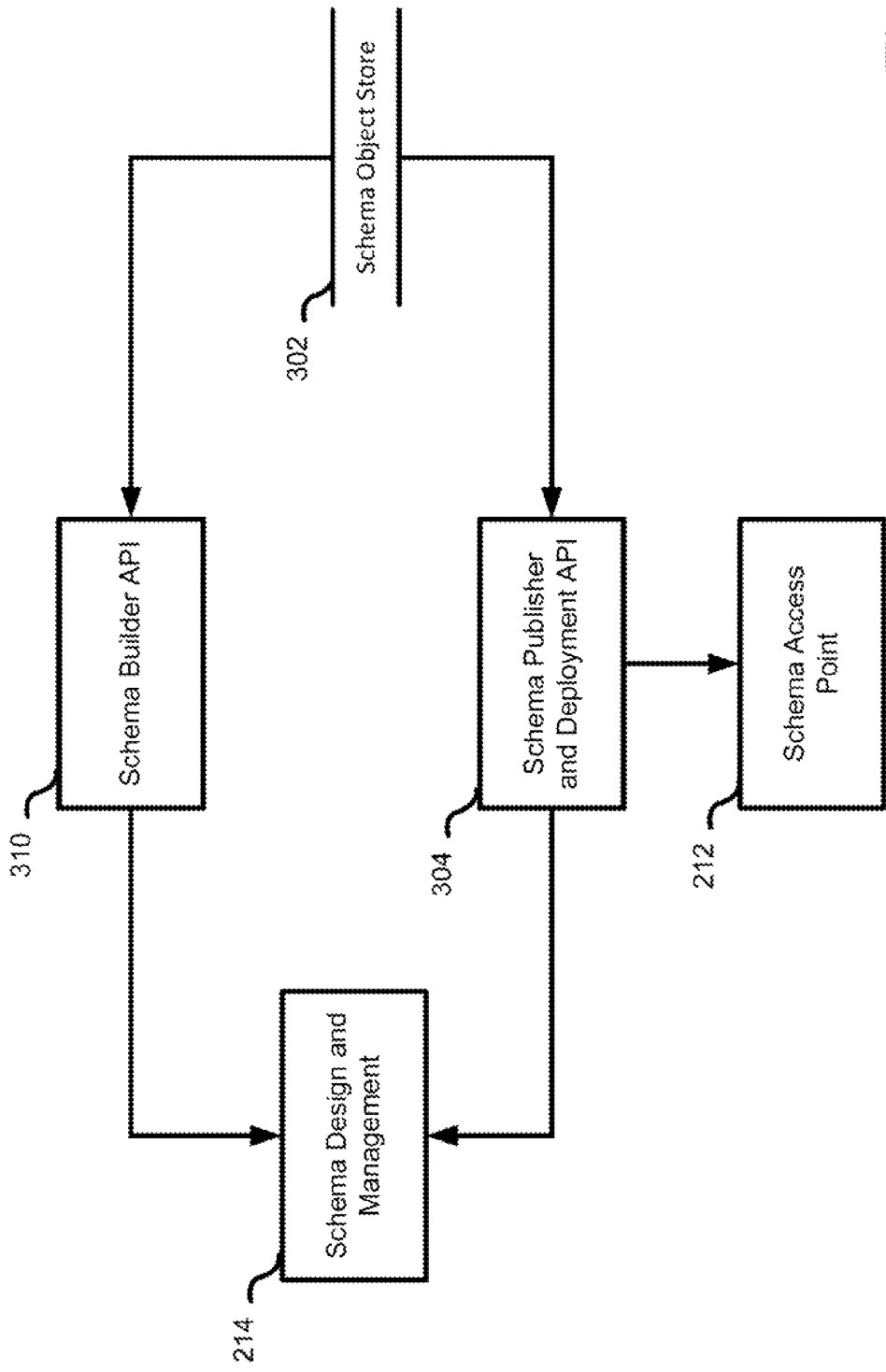
FIG. 3 shows a representation of schema design and management.

Client I/O manager API (Application programming interface) 206 receives client requests through schema client for schemas, schema views and dynamic value providers, as well, client I/O manager API 210 provides caching services of schemas, views and dynamic value providers to schema client 206. Client I/O manager API 210 provides schema serialization configuration. Schema client 206 requests schemas and views from client I/O manager API 210. With these schemas and views object I/O manager 210 is called to read and write metadata to and from information objects 146. If the information objects are being updated with metadata values that are replacing or supplementing existing values, then schema client 206 correlates the existing metadata with any new values. As well, schema client 206 is responsible for serializing metadata coming to and from the client I/O manager 208 and applications 202. Schema client 206 also provides the serialized metadata object to the applications 202. Schema client 206 also provides for collection of metadata and the presentation of metadata to and from Information object in either a 3rd party callable API or through a standard user control 204. Object I/O manager 208 provides reading and writing of metadata to and from information object in a repository associated with the information object. Applications and 3rd parties 202 represents the final part of the metadata infrastructure cycle by providing consumption methods of 3rd party APIs or user control 204 instantiated as user interface on the computing device for collection or displaying of the metadata FIG. 3 shows a representation of schema design and management diagram: Schema design and management 214 provide a graphical user interface, for example as shown in FIGS. 9-13, and expose the schema builder API 304 for 3rd party consumption. Schema design and management 214 in consuming schema builder API 310 implements Creation, Read, Update and Delete functionality (CRUD) on the schema being developed. Schema builder API 310 utilizes schema object store 302 for the storage of the schemas in an xml format, for example as shown in FIGS. 14 and 15. Schema publisher 304 and deployment API is used by schema design and management 304 for the publishing of schema structure definitions and deployment instructions from schema object store 302 through schema access point 212.

Figure 4:
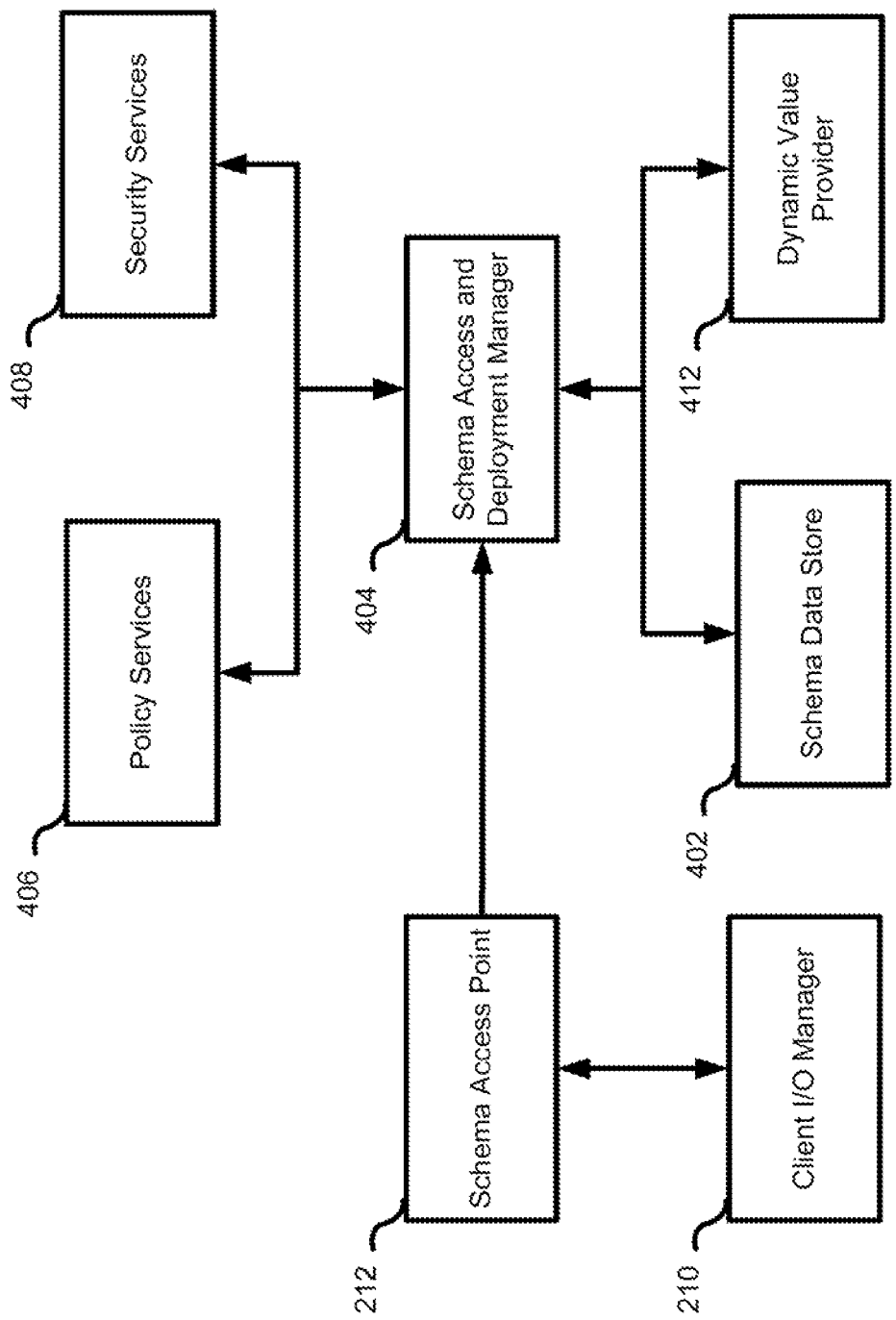
FIG. 4 shows a schematic representation of schema access point.

FIG. 4 shows a schematic representation of schema access point 120 function diagram. Schema access point 212 receives requests for schemas, view(s) and dynamic value providers from schema design and management 214. The request can be accompanied with a set of credentials to authenticate the identity of the requestor. The credentials could be a unique identifier and passcode, a set of claims, roles or other significantly strong and unique identifications. Based on a successful authentication by a schema access manager 404 retrieves the requested schemas and views from 402 schema data store. As well, any dynamic value provider definitions in the schemas or views is requested through dynamic value provider 412. The schemas and views returned through schema access point 212 are sent to security services 408 where based on policy services 406 they may be cryptographically encrypted and signed to ensure secure delivery to the requesting schema design and management 214 or applications or 3rd party APIs 202 or User Control 204. Security services 408 provide encryption, signing and authentication services to all parts of the metadata infrastructure. Policy services 406 provides policy decisions and authorization requests to all parts of the metadata infrastructure. Policy services 408 can provide self-contained policy decisions or can reach out to 3rd party policy services reachable through Security Assertion Markup Language (SAML) or other like protocols. Dynamic value providers 412 return dynamic values for metadata descriptors that are configured to use dynamic values. The source of dynamic values can be information systems, external data source, physical devices or anything else that exposes an interface. Schema data store 402 is the authoritative source of all schemas and views. The store 402 itself can take any form that supports the storage of information in either a relational way or non-relational way and can be local to the client machine, in the enterprise or stored in a distributed or cloud environment. Client I/O manager 210 requests schemas, views, dynamic values, policy services 210 and security services 210 from schema access point 210. Schema access point 210 can be located on the client, in the enterprise or in the cloud.

Figure 5:
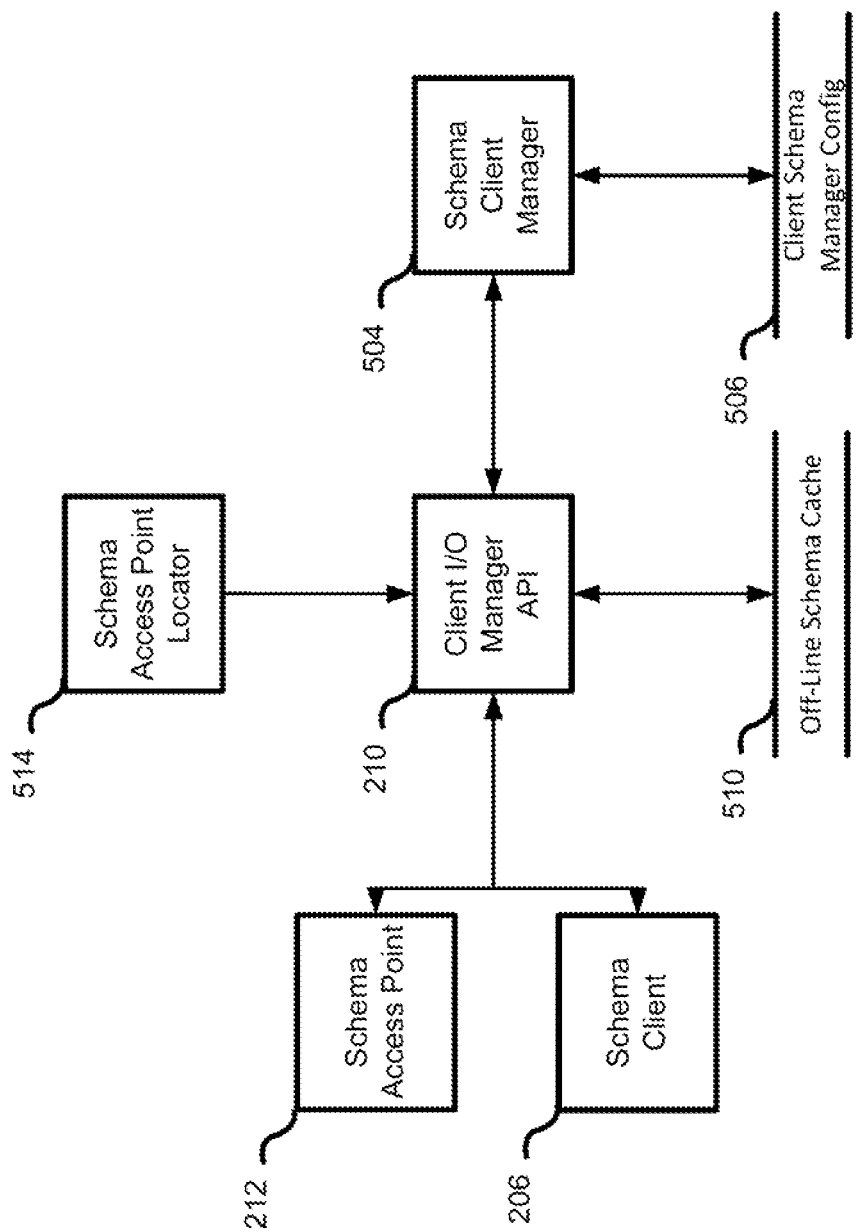
FIG. 5 shows a schematic representation of client I/O manager API.

FIG. 5 shows a schematic representation of client I/O manager API diagram. Client I/O manager API 210 services requests from Schema clients 210. When a request for a schemas, views or dynamic values is made, client I/O manager 210 references off-Line schema cache 510. The configuration for the freshness of the cache and which requests are eligible for retrieval from cache is provided from client schema manager configuration 506 through schema client manager 504. If the requested information is not in the cache, or the cache is expired then a request is made to schema access point 212. When the request is returned from schema access point 212, it is cached or portions are cached based on the policy services 406 as referenced by schema access point 212 when servicing the request. Schema access point locator 514 provides the location of the schema access point 212 to client I/O manager API 210. The location of schema access point 212 is dependent on the deployment of schema access point 212. Schema client manager 504 provides configuration services to both schema access point locator 514 and client I/O manager 210. The location of client schema manager configuration 506 can be local, on an enterprise server or stored in network accessible storage. Off-Line cache 510 is stored locally to the requesting client. The cache 510 can be signed and encrypted for the specific client that has requested the cache.

Figure 6:
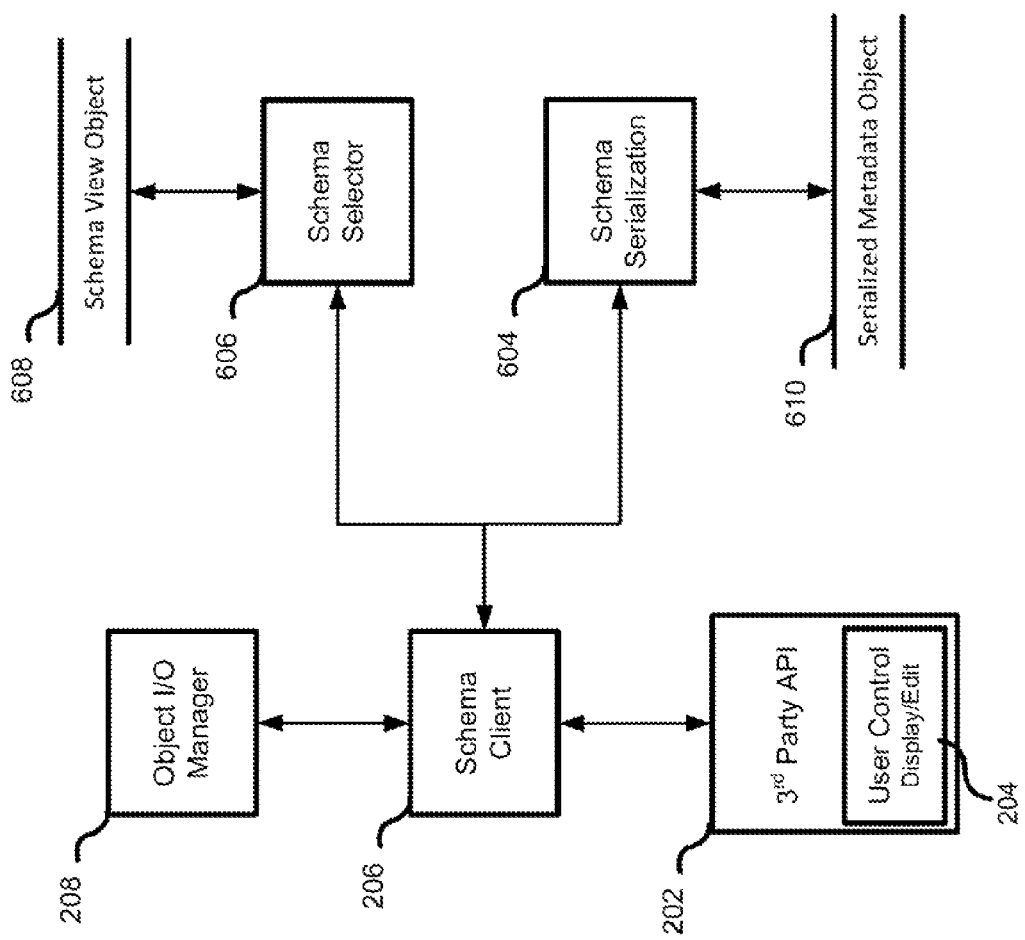
FIG. 6 shows a schematic representation of schema client API.

FIG. 6 shows a schematic representation of schema client API. Schema client services 206 requests from 3rd party APIs 202 or User Control 204 for reading and writing of metadata from information objects. To facilitate that request schema selector 606 generates schema view object 608 based on the current schema or view for information object and is passed to schema client 206 for formatting or editing metadata. Schema client 206 correlates metadata read from information object with the matching schema view object 608. Schema serialization 604 provides serialization services for converting the metadata format stored with Information object to the native format. Serialized metadata object 610 is the result of serializing the metadata format from information object and is passed to schema client 206 for use correlating the metadata.

Figure 7:
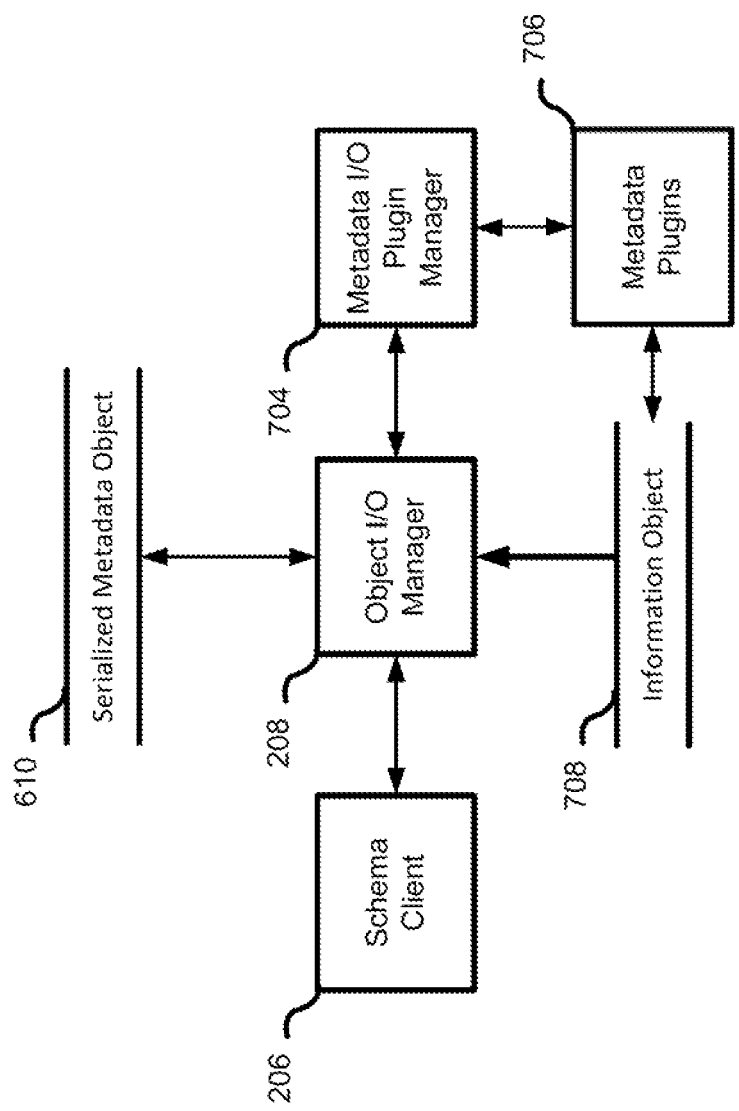
FIG. 7 shows a schematic representation of object I/O manager.

FIG. 7 shows a schematic representation of object I/O manager. Object I/O manager 208 receives a request to read or write metadata associated with information object 708. Object I/O manager 208 determines the type of information object 708 and passes it to schema clients 206 for selection of schema view object 608. Based on the schema view object 608, a serialized metadata object 610 is created. Based on the schema view object 608, metadata I/O plugin manager 704 knows which metadata plug-in 706 to use to read or write the metadata to or from information object 708. The metadata is either added to the information object 708 from the serialized metadata object 610 or the read metadata is added to the serialized metadata object 610 and passed to schema client 206 for serialization and correlation.

Figure 8:
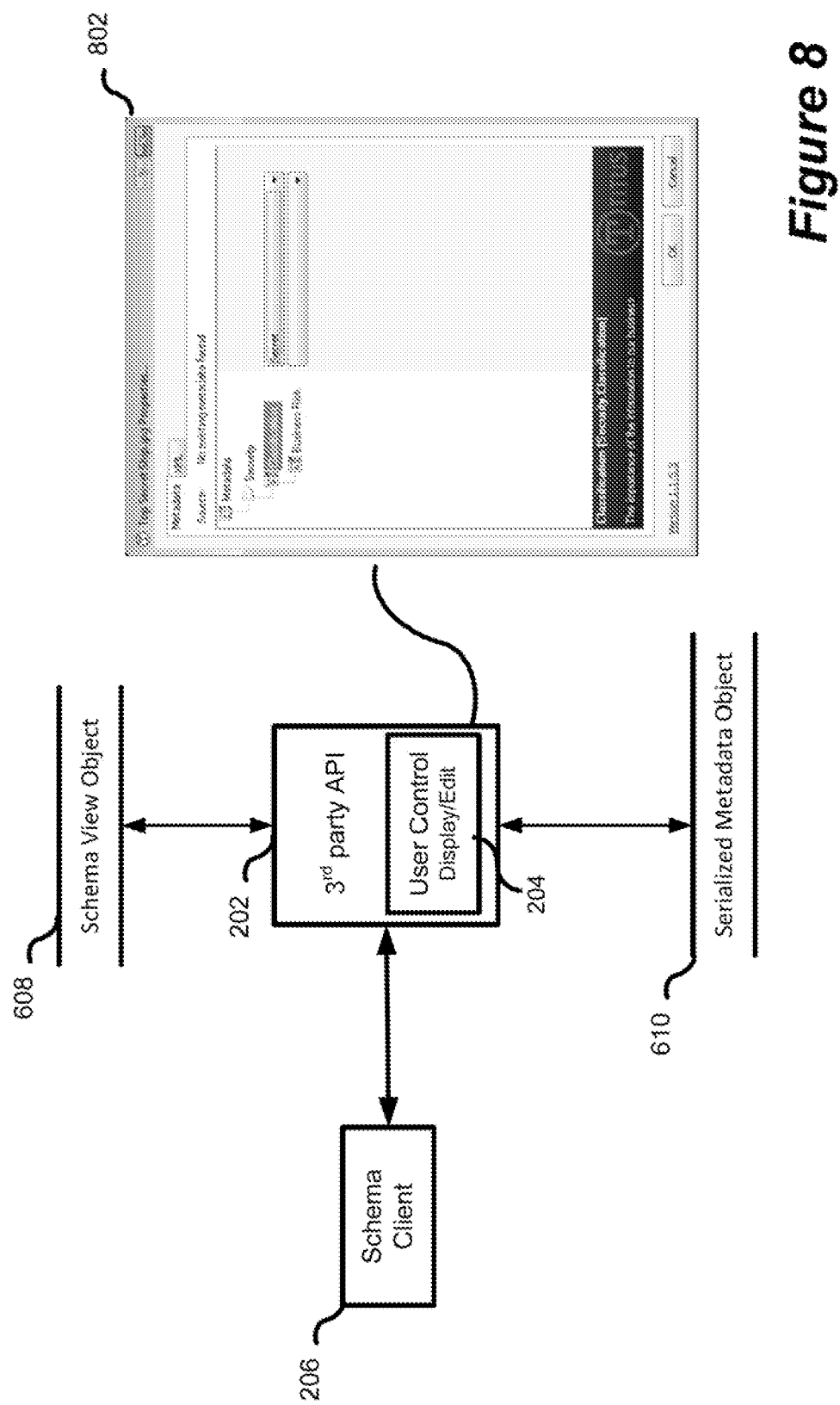
FIG. 8 shows a schematic representation of $3^{rd}$ party APIs and user control.

FIG. 8 shows a schematic representation of applications and 3rd party APIs 202 and user control 204. An instantiated user interface 802 on the schema client is from user control 204. When metadata is to be added to information object 708, a request is made to schema client 206 to determine the view for the information object 708. A schema view object 608 is returned and used to initialize 3rd party APIs 202 or user control 204. When metadata is collected for information object 708, it is placed in a serialized metadata object 610 and passed to schema client 206 for association with 708 information object. When metadata is read from 708 Information object, it is returned to 3rd party APIs 202 or user control 204 in a serialized metadata object 610 and a schema view object 608 to initialize 3rd party APIs 202 or user control 204.

Figure 9:
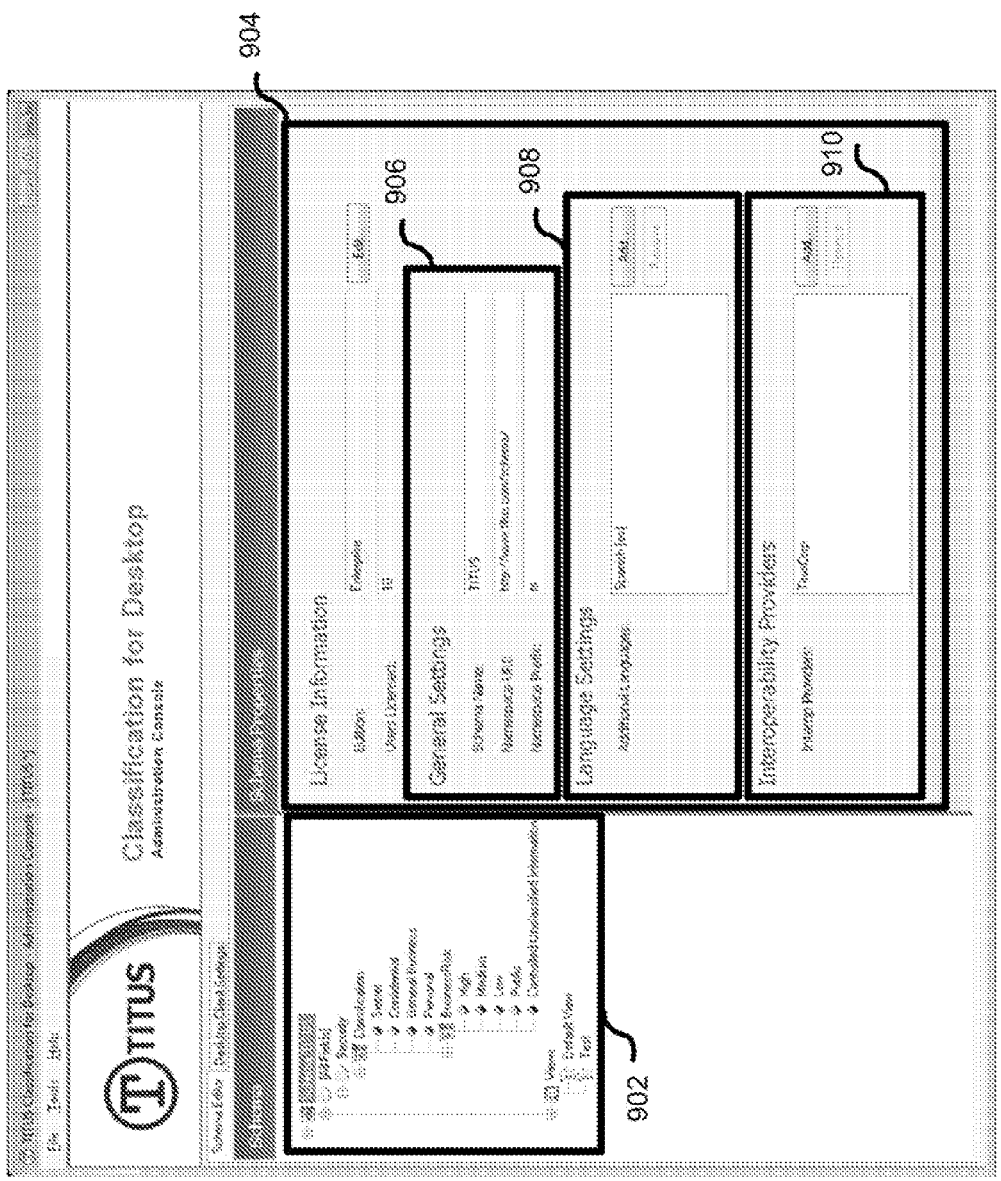
FIG. 9 is a representation of a display of an application for generating a hierarchical metadata structure.

FIG. 9 is a representation of a display for a schema configuration for generating a hierarchical metadata structure. The hierarchical metadata 902 is shown for a sample schema. The tree structure display 902 show clearly the relationship amongst metadata descriptors. As well views of the metadata schema is shown, including a default view that contains all of the metadata descriptors and a view called "Test" that includes a reduced set of metadata descriptors. General settings 906 provides for the example schema including its name, the namespace URI and the Namespace Prefix used in the sample schema. The sample schema has an additional language 908 for example a definition of Spanish. Supported names for the language definition are selectable from ISO 3166-1 Alpha-2 code. The definition of an interoperability provider called "Tituscorp" is provided in 902 which is used to be able to specify a mapping between the sample schema and a schema supported through the "Tituscorp" interoperability provider. The user of the schema administrator can edit information provided to modify the schema structure definition information.

Figure 10:
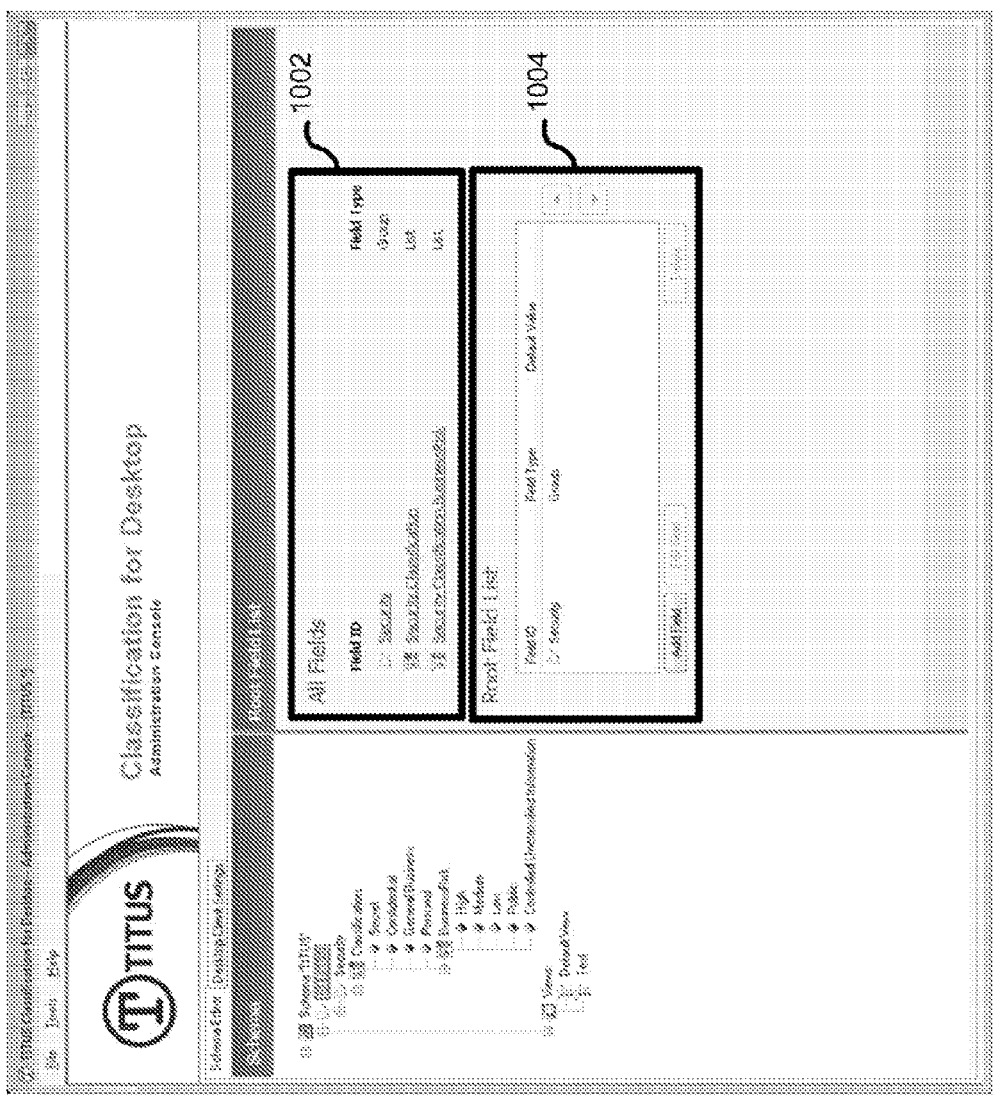
FIG. 10 is a representation of a display of an application for generating a hierarchical metadata structure.

FIG. 10 is a representation of a display of the Root Level of a Schema for generating a hierarchical metadata structure. An ordered list 1002 is provided of all metadata descriptors defined in the example schema, they are listed in the order in which they appear in the hierarchical schema in the left side pane 902. Root fields 1004 are shown only for the example schema. The example schema only has one root entry called "Security" and its metadata descriptor type is group. Any metadata descriptor type can be a root field. There can be multiple root fields, allowing for multi-root branching of the schema.

Figure 11:
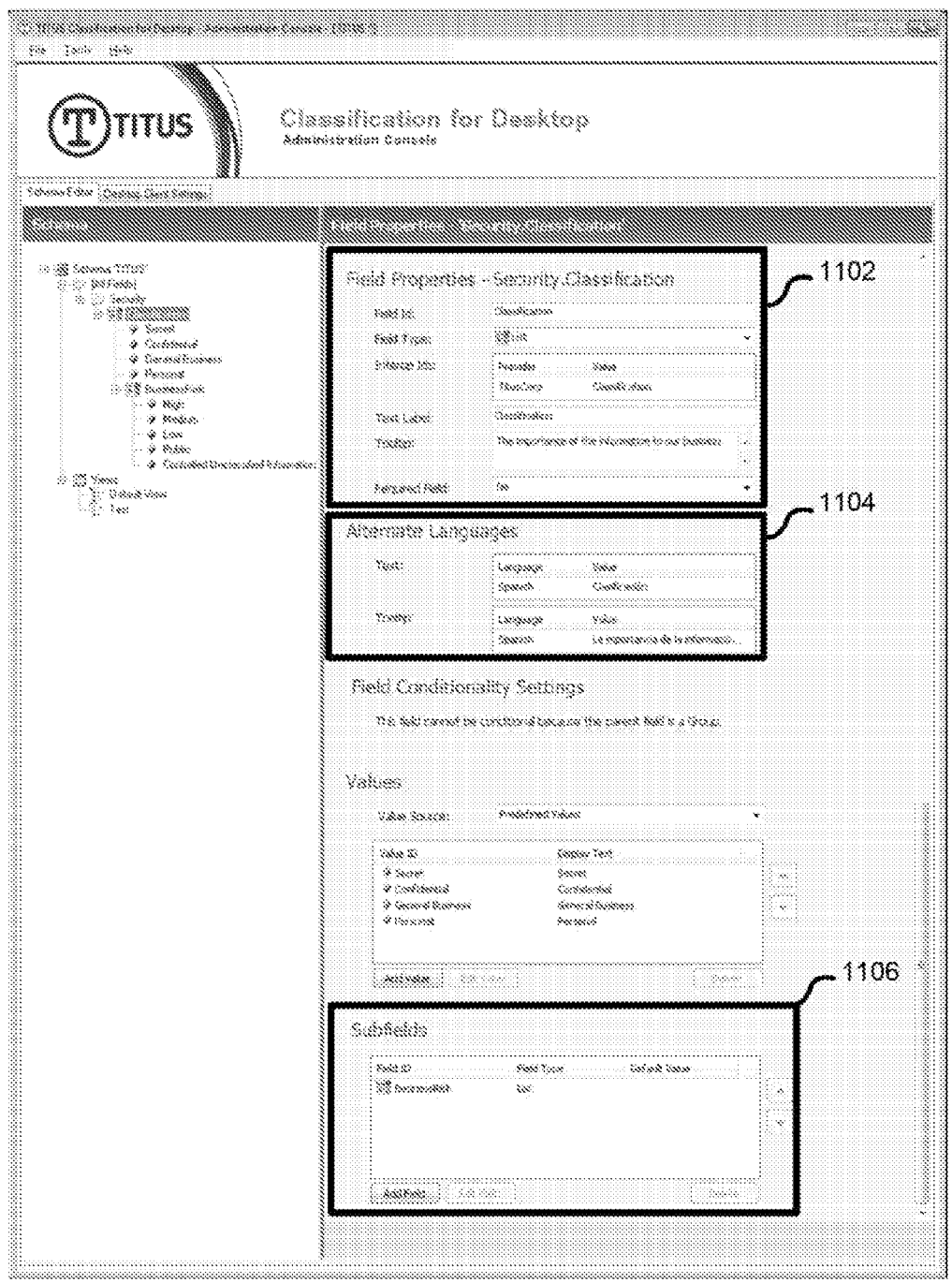
FIG. 11 is a representation of a display of an application for generating a hierarchical metadata structure.

FIG. 11 is a representation of a display of metadata descriptor attributes for generating a hierarchical metadata structure. Shows some attributes of the metadata descriptor "Classification" 1102. The fully distinguished name (FDN) for metadata descriptor "Classification" is shown beside the label "Field Properties". The FDN for the metadata descriptor is "Security.Classification". This represents that "Classification" is a direct child of the parent metadata descriptor "Security". As well the metadata descriptor field type "List" is shown. The supported metadata descriptor field types include; string; Number; DateTime; Boolean; List and Group. Since an alternate language was defined, the alternate language display 1104 shows the alternate Text and Tooltip for the metadata descriptor. If multiple languages had been defined, then multiple sets of Text and Tooltip would be used for each language enumerated in 908. 1106 shows that a metadata descriptor "BusinessRisk" is a child of the current metadata descriptor "Classification".

Figure 12:
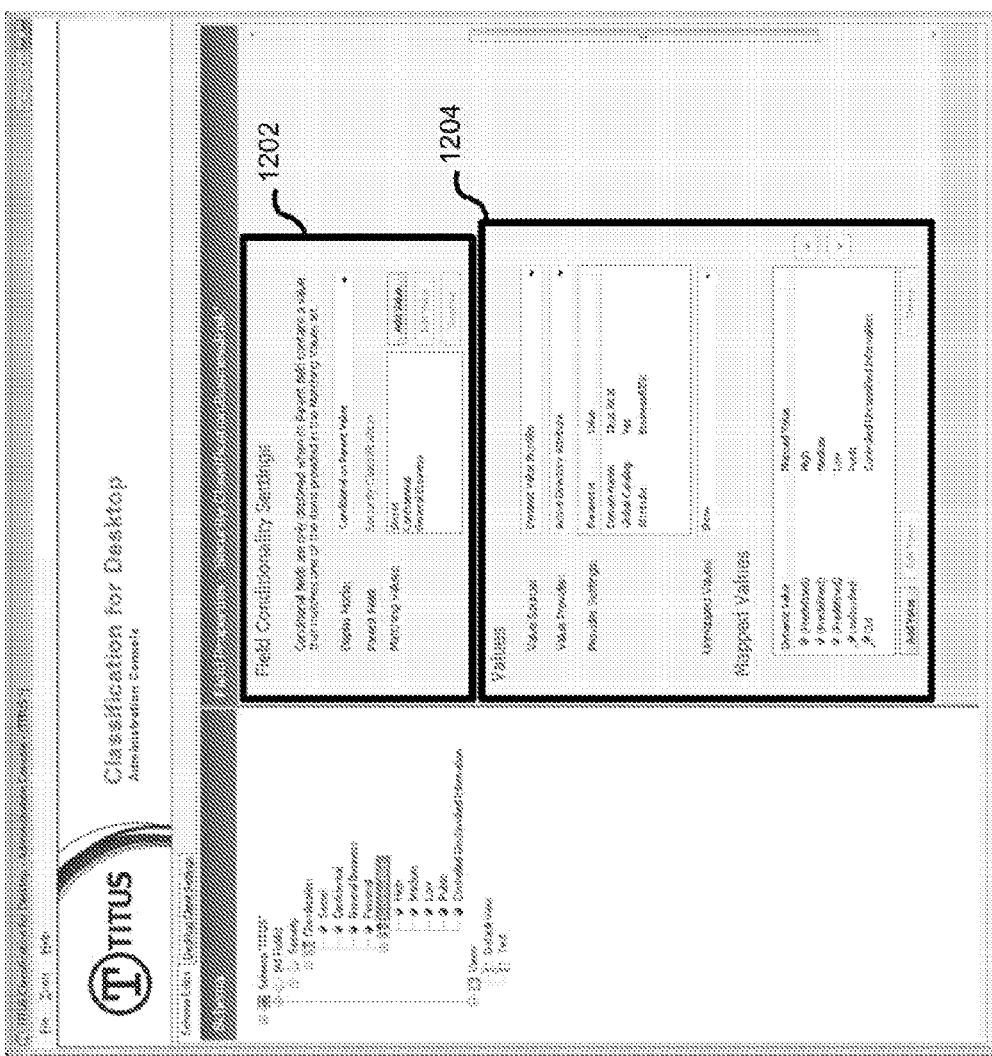
FIG. 12 is a representation of a display of an application for generating a hierarchical metadata structure.

FIG. 12 is a representation of a display of metadata descriptor attributes for defining conditionality and dynamic value provider for generating a hierarchical metadata structure.

That the conditionality 1202 of metadata descriptor "Security.Classification.BusinessRisk" has its visibility conditionally on its parent metadata descriptor "Security.Classification". "Security.Classification.BusinessRisk" will only be shown if the parent metadata descriptor has a value of one of the following: Secret; Confidential or General Business. The values 1204 metadata descriptor "Security.Classification.BusinessRisk" is a dynamic value provider receiving its values from a Directory Service for example Active Directory™ attribute called BusinessRISK. A dynamic value provider can be any accessible data source in which the retrieved data may change over time. A dynamic value provider may provide a value to be stored in the metadata of the information object or maybe identified by a reference in the metadata of the information object. By using a reference to the dynamic value provider with in the metadata of the information object, when the metadata is retrieved an associated value is also retrieved from the associated dynamic value provider enabling real time values to be populated in the metadata. This can facilitate a trigger to change properties of the information object or related dependencies. Conditionality may also be applied in regards to the dynamic value provider in terms of a resulting value returned by the dynamic value provider and courses of action that may be performed in response to the returned value. As well the attribute on the dynamic value provider to show unmapped values is set to yes. In this setting, any values that do not have a definition in the mapped values table will still be returned. Mapped values table allows for the mapping of a dynamic value to a valueID that in turn can have a text label that is more user friendly in its naming convention. A dynamic value provider List can also contain static values to supplement the mapped values. These additional values are added to the possible list values by an explicit definition in the mapped values table.

Figure 13:
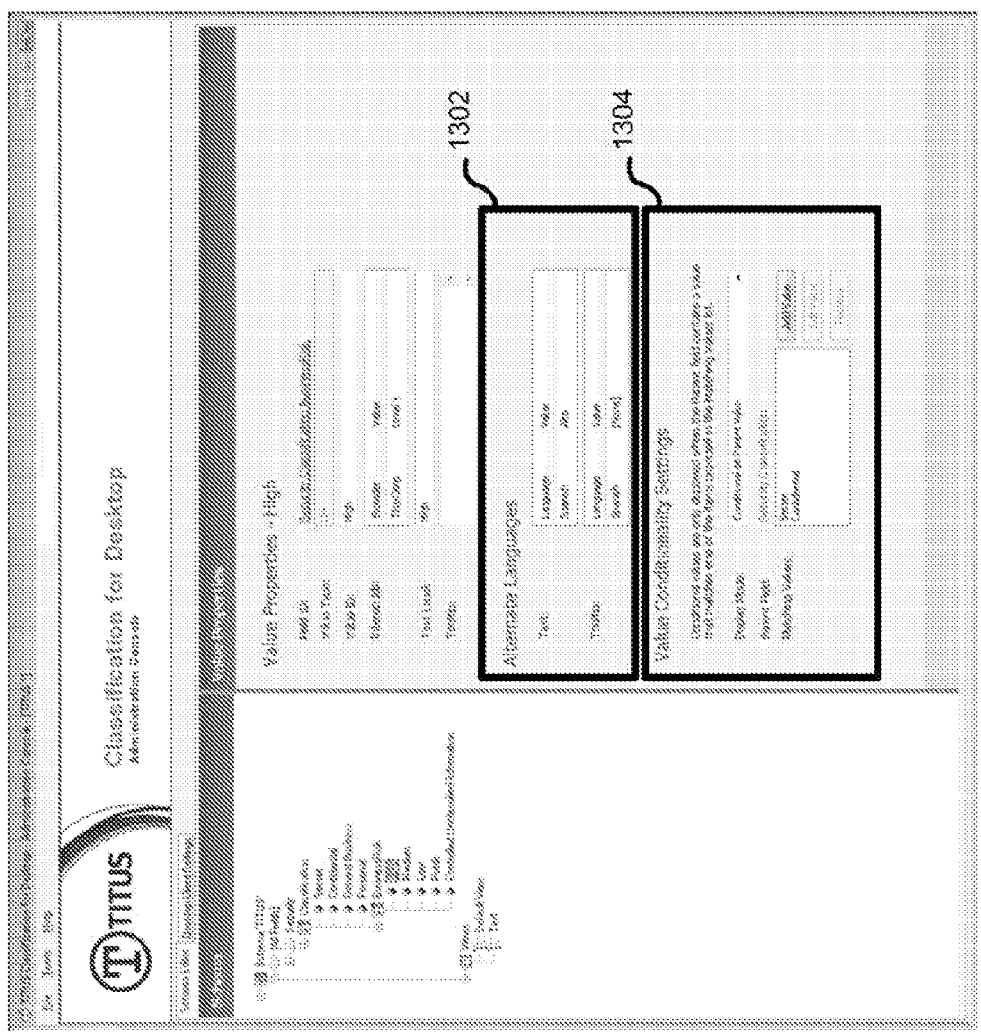
FIG. 13 is a representation of a display of an application for generating a hierarchical metadata structure.

FIG. 13 is a representation of a display of attributes of a metadata descriptor value for generating a hierarchical metadata structure. A value of a metadata descriptor of type list can have an alternate language 1302 associated to it as defined in the language settings 908. If multiple languages had been defined in 908, then multiple sets of text and tooltip would be used for each language enumerated in language settings 908. As well conditionality can also be set on the list value. In this case the value of "High" will only be provided as a selection choice if the parent metadata descriptor "Security.Classification" has a value of: "Secret" or "Confidential".

FIGS. 14, 14*a*, 15, 15*a* and 15*b* concatenated together form the complete sample schema. FIG. 14 is a Schema fragment 1402 show the schema structure definition including version of the Schema format, character encoding, schema name space and the name space prefix. 1401 outlines the additional Languages defined for the Schema. 1406 lists the interoperability providers. 1408 show the use of additional language definition for a metadata descriptor. 1412 shows how metadata descriptors are designated to be part of a view. FIG. 15 is a Schema fragment 1502 show the schema structure definition for a dynamic value provider. 1504 shows schema conditionality for a metadata descriptor based on the parent metadata descriptor values of "Secret" or "Confidential". FIG. 15*a* is a schema fragment 1502*a* shows schema conditionality on a metadata descriptor value based on the parent metadata descriptor value of "General Business".

Figure 16:
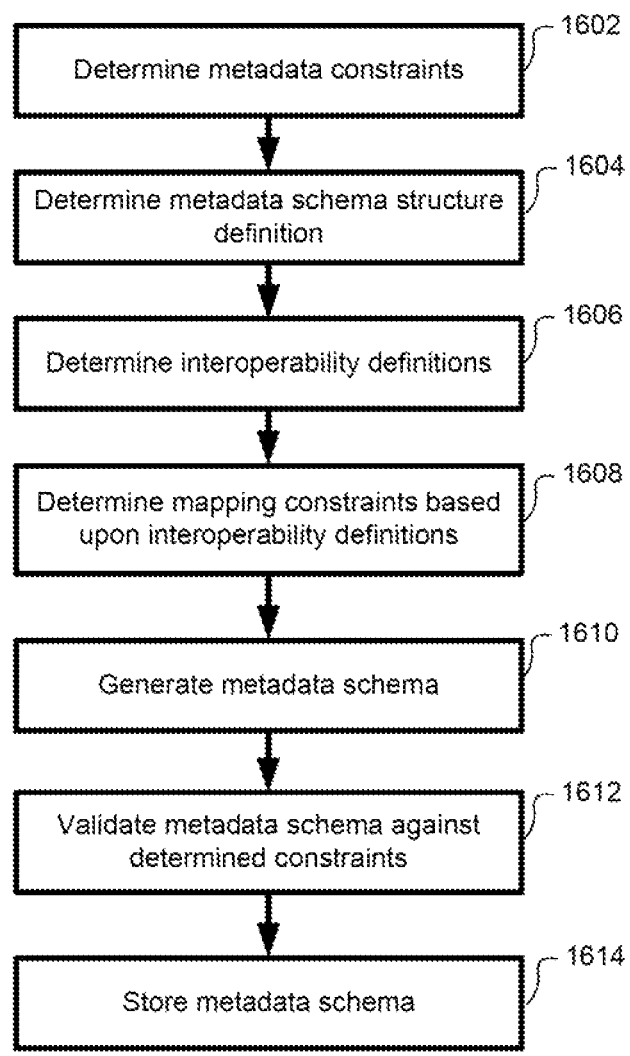
FIG. 16 is a flowchart of a method of generating metadata for an information object type in an administrative function.

FIG. 16 is a flowchart of a method of generating a metadata schema in an administration function. The metadata constraints are determined (1602) based on the type and nature of the information objects to have metadata associated with them. This can include the importance, impact and risk of that information object being improperly handled, exposed or used for unintended purposes. These metadata constraints will help in determining the types of metadata descriptors to be used in the creation of schema as well as possible valid value ranges to be associated with the metadata descriptors. Certain metadata descriptor values may not be downgraded to a lower value or changed at all. As well the supported languages for the schema. The metadata schema structure definition is determined (1604) in a hierarchical manner. The hierarchical structure will again be driven by the discoveries based upon the determined metadata descriptors and constraints and discernable interrelationships between descriptors and constraints. In addition, the metadata structure definition may account for multiple information object types in determining the appropriate metadata structure. Some of the structure decisions will include: the branches of single or multiple root metadata descriptors; if some of the branches because of sensitivity or "Need to know" may be restricted with a secondary authentication mechanism. The interoperability definitions are determined (1606) and requires comparing the created schema to already existing schema for interoperability possibilities for both the metadata descriptor and value, as well as any specialized serialization of the metadata from the current metadata schema to an existing one. Mapping constraints are generated (1608) based upon interoperability definitions entails generating schema rules to describe the mapping of native metadata descriptors and associated values to their equivalents in the interoperable schema. The metadata schema is generated (1610) and involves: the adding of additional metadata descriptors on the defined branches and roots; setting of metadata descriptor attributes; value ranges on the metadata descriptor attributes; conditionality of metadata descriptors and values to enable the "guiding" of the metadata selection; the specification of alternate languages as defined; and the determination of which metadata descriptors should referenced in different views based on the information object type to be associated to that view. The metadata schema is validated (1612) against determined constraints, a consistency check on the metadata descriptors and values such that they fit inside the constraints. The proper access rights are available for the dynamic value providers defined and the proper On Downgrade or On Change attributes are set on the appropriate metadata descriptors. The metadata schema is stored (1614) in a safe non deployed area before it is published. The stored schema can be encrypted and signed to guarantee confidentiality and trust. As well, when the schema is to be published, certain parts of it may require signing and or encryption based on the importance or secrecy of the metadata descriptors and their associated values.

Figure 17:
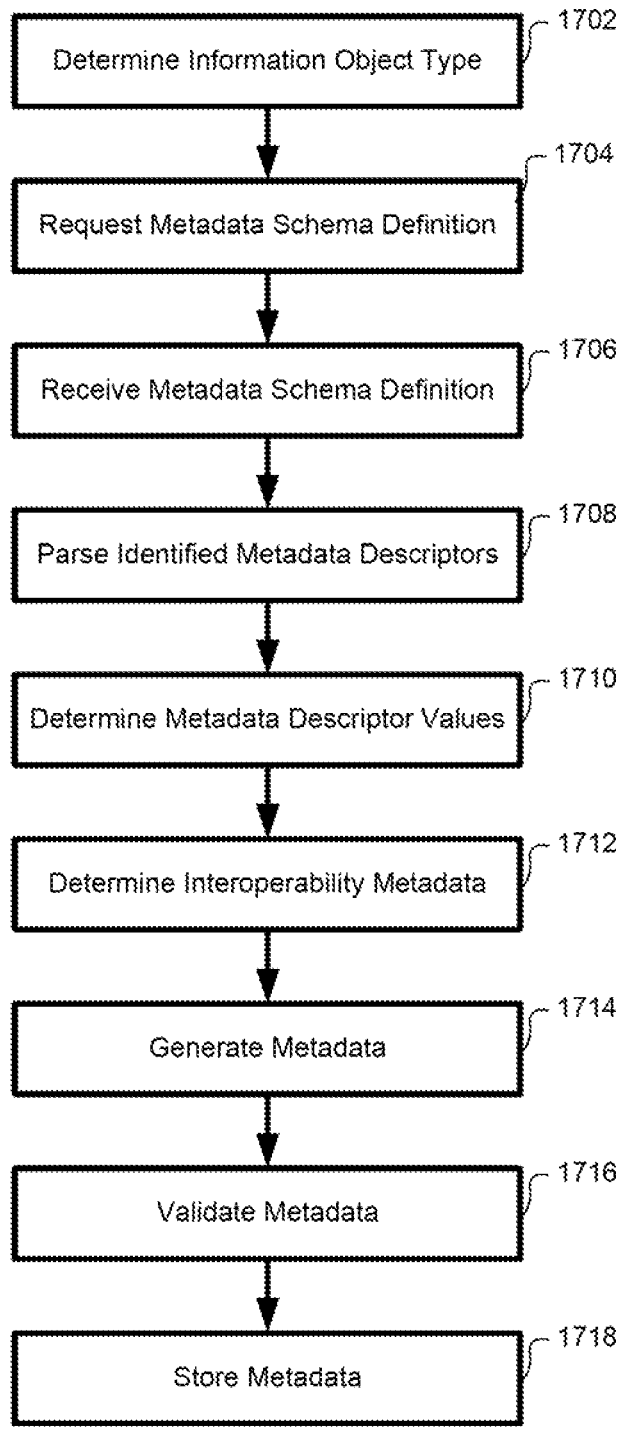
FIG. 17 is a flowchart of a method of generating metadata for an information object type.

FIG. 17 is a flowchart of a method of generating metadata for an information object type. An information object type is determined (1702) by examining the unique data points that differentiate this information objects from others. A metadata schema structure definition is requested (1704) to a access point or by a query to a schema database based on the determined information object type. The object type may be defined based upon one or more properties associated with the information object and/or or based upon the location or access method to the information object type. That is an information object type may have different schema associated with it depending properties associated with but not necessarily contained in the information object, such as storage location. A metadata schema structure definition is received (1706) from the access point or schema database in response to the request and is used for the information object, this includes verifying the signature on the schema, and decrypting parts of the schema encrypted for confidentiality.

Identified metadata descriptors are then parsed (1708) to determine the metadata descriptors and associated values to be displayed on the schema layout that needs to be pragmatically provided by a 3rd party application through schema client 206. Metadata descriptor values are then determined (1710) based on the values provided by the user or 3rd party application in conjunction with any values provided from dynamic value providers or if there was existing metadata with the information object. Once the metadata is determined, any interoperability metadata is created (1712) based on the interoperability mappings and mapping rules included with the schema. The metadata is added (1714) to the serialized metadata object 610 and any interoperability providers. A consistency check can then be performed to validate the metadata (1716) added or updated against known constraints for the metadata schema and any interoperability providers. The metadata is then stored (1718) by passing the serialized metadata object 610 to schema client 206.

Figure 18:
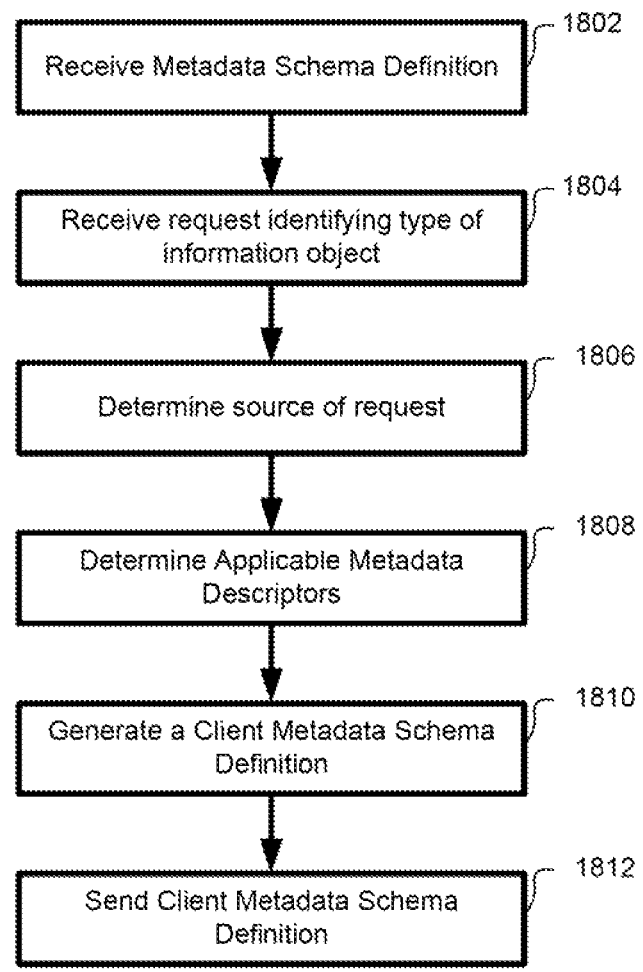
FIG. 18 is a flowchart of a method of sending a metadata schema structure definition to a client.

FIG. 18 is a flowchart of a method of sending a metadata schema structure definition to a client. A metadata schema structure definition is received (1802) when 210 client I/O manager has a cached schema or can contact schema access point to get schema(s) and view(s). A request to identifying type of information objects is received (1804) through from a computing device which needs to classify an information object to a schema view object 608. The source of request is determined (1806) so the proper schema(s) and view(s) are returned based on policy services 406. A client metadata schema structure definition is generated (1808) based on schema view object 608 and the results of policy services 406. The generation of metadata schema structure definition may also include interoperability definitions from the metadata schema structure definition and a serialization definition to enable interchange with an external metadata schema format based upon the source of the request. Once the appropriate metadata schema structure definition has been generated the client metadata schema structure definition is sent (1812) to the schema client 206.

Figure 19:
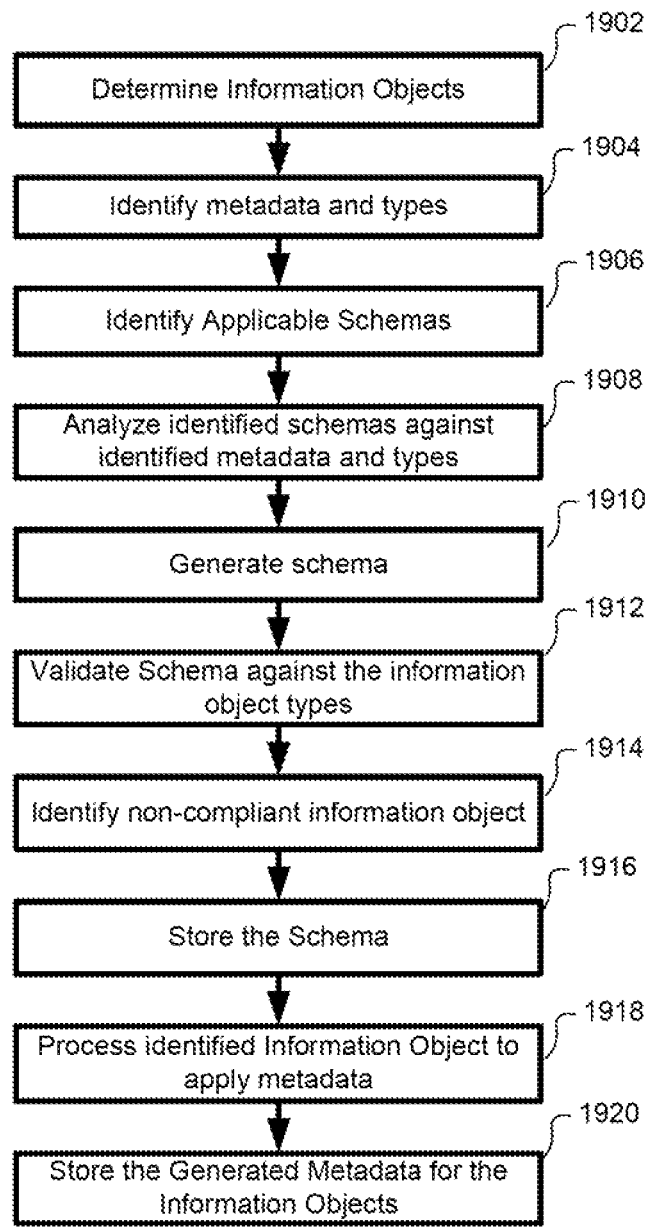
FIG. 19 is a flowchart of a method of building a metadata schema autonomously.

FIG. 19 is a flowchart of a method of building a metadata schema autonomously. An automated system for examining a corpus of information objects to determine the type of metadata that can be associated with the objects. The system analyzes the information objects stored in one or more storage device to determine (1902) information that can be associated with the object. This maybe performed based on metadata existing with the object, discernible characteristics of the object such as content of the object, information object attributes, using templates to determine the types of metadata available or by performing an analysis of the object itself to identify potentially discernible characteristics that maybe used for metadata classification. The object type(s) are determined after the automated system has completed and an accounting of the different information object types is made. The metadata and types of metadata descriptors and their values are identified (1904) based upon properties associated with the information objects which is then structured. Based upon the determined object types metadata schema templates or metadata schema structure definition files which are similar to the identified object types can be identified (1906) from the identified metadata schema templates an analysis (1908) can be performed against the identified metadata and types of information objects to generate a metadata schema (1910).

During analysis of the metadata schema templates identification of schema structures which are bounded by previously predefined schema structure constraints is performed, which has the greatest degree of confidence to encompass the identified metadata, based on for example the type of information object, the number of metadata descriptors discernable from the object, similarity of the descriptors in terms of size, values, order, dependencies or value constraints. For example the constraints may be items such as a defined number of metadata fields that may be defined within the schema, a best fit to the identified metadata of all of the information objects or maximize the population objects that can be classified versus schema complexity. The metadata schema templates may be applicable to a particular information object type or may contain views and be applicable to multiple information object types.

The generation of the schema may include constraints and metadata descriptor attributes and values, language labels to metadata items for the different languages that need to be supported and provide any "Human Friendly" text labels for the automatically generated ValueIDs, configuration and references to dynamic value providers that may be required based on the information object types analyzed. The dynamic value providers may be used to gather metadata classification levels or provide a human defined list of values for certain metadata descriptors, logic expressions can then be from the constraints that are imposed on the metadata descriptors or from the intrinsic understanding that certain metadata descriptor values are not applicable or available based on the selection of previous metadata descriptors, views of schema based on the results of the determined information object types and the most relative schema views are assigned to appropriate information objects. In generation of the schema commonly used selections based on the templates or commonality of the attributes of the information objects can be defined to provide an easy way for end users to quickly set a views metadata descriptor values to predefined values based on the analysis performed of the stored information objects. Security policies may also be generated based upon are then defined based the analysis of the information object stored and provides the system which branches of the schema may need additional authentication based on the level of sensitivity in the metadata descriptor or their values. Additional security policies may be defined that only users or systems with certain security attributes can access this schema and associated views.

The generated schema may then be validated against a sample population of information object types to ensure that constraints have been met (1914). If the determined schema does not meet the constraints, the schema generation process maybe repeated until an acceptable schema is generated. Alternatively, the best fit schema maybe presented with metrics identifying compliance or non compliance of that schema and information objects which do not fit the schema model. The schema and/or metadata descriptors then may be signed and/or encrypted when stored (1916) to provide confidentiality and trust in the autonomously generated schema. The schema can then be made available to schema consumers or used by the intelligent system to classify the information objects identified. For example the intelligent system may then process the information objects that where initially analyzed and generate metadata conforming to the previously generated schema (1918). Additionally the metadata schema maybe applied against one or more information object stores that have been identified being similar to or compatible with the generated metadata schema. The metadata for each of the information objects can then be stored (1920). If processing of the information objects is performed by the intelligent system classification exceptions maybe identified and provided to the metadata schema generation process to further refine the schema either in subsequent interactions or in a refinement process.

Figure 20:
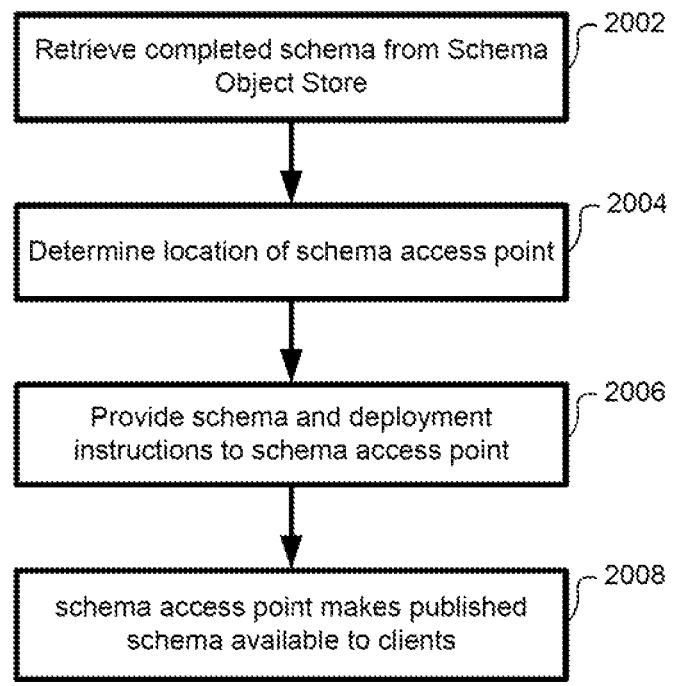
FIG. 20 is a flowchart of a method of publishing a metadata schema.

FIG. 20 is a flowchart of a method of publishing a metadata schema. The completed schema is retrieved (2002) from the schema object store using schema builder API 310. The location of schema access point is retrieved (2004) from configuration information for schema design and management 214. Knowing schema access point location schema and deployment instructions can be provided (2006) to the schema access point with calls to schema publisher and deployment API 304. schema access point makes published schema available to clients (2008) by using the schema access manager 404 to store the schema in schema data store 402.

Figure 21:
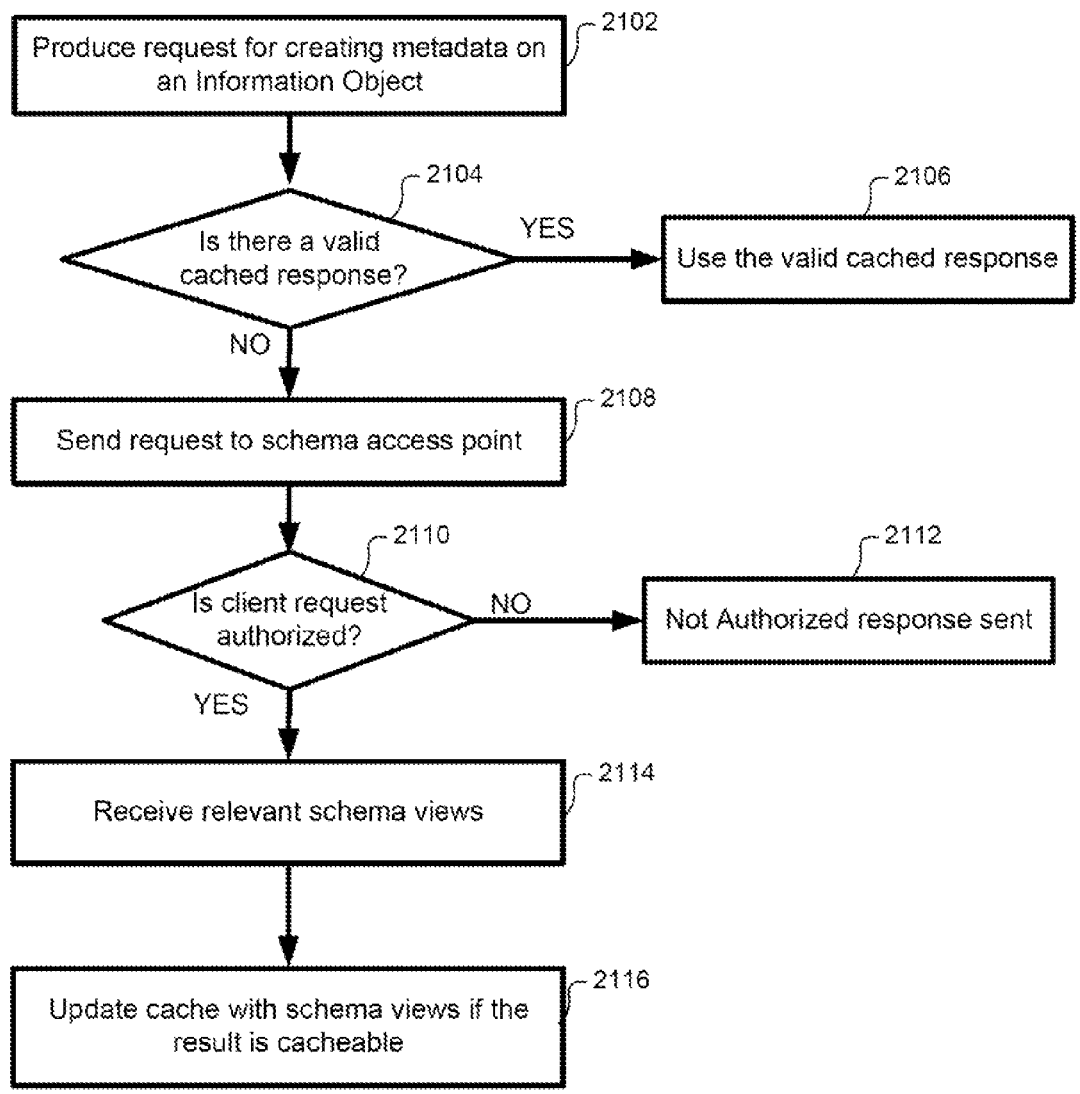
FIG. 21 is a flowchart of a method of schema client interaction with a schema access point for retrieval of schema(s) and view(s)

FIG. 21 is a flowchart of a method of schema client interaction with a schema access point for retrieval of schema(s) and view(s) via client I/O manager API produce a request (2102) for creating metadata on an information object is processed through schema client 206. If there is a valid cached response available as determined by client i/o manager 210 by referencing off-line schema cache 510, (YES at 2104), the valid cached response is returned to schema client 206 for the originating client. If there was not a valid cached response in off-line schema cache 510 (NO at 2104) then a request is sent to the schema access point 212 (2108) by client I/O manager 210. If the client request is not authorized as determined by policy services 406 of schema access point 212 to schema access manager 404, (NO at 2110), a not authorized response is returned (2112) from policy services 406 then schema access point 212 returns to client i/o manager API 210 and in turn to schema client 206 that the request for schema was not authorized. If the request was authorized by 406 policy services (YES at 2110) then the relevant schema views are received (2114) by schema access manager 404 requesting the appropriate schema from schema data store 402 and is returned to schema access point 212 to client I/O manager API 210 and the cache is updated (2116) with schema views if the result is cacheable into 510 off-line schema cache.

Figure 22:
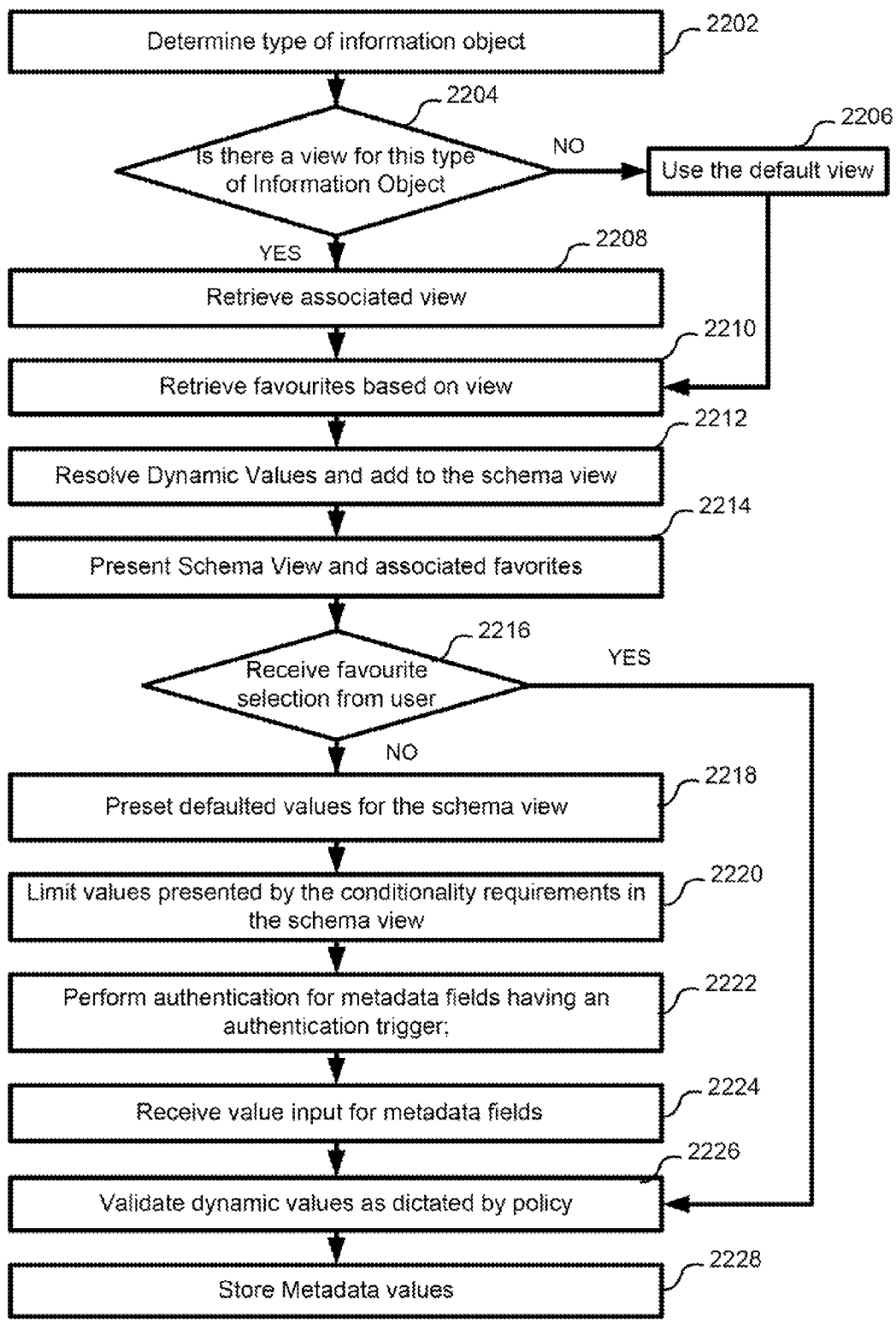
FIG. 22 is a flowchart of a method of adding metadata to an information object.

FIG. 22 is a flowchart of a method of adding metadata to an information object. The type of information object is determined (2202) through schema client 206 calling the object i/o manager 208 to access the information object 708 and passes it to schema client 206 for selection of schema view object 608. If there is a view for this type of information object (YES at 2204) the view is retrieved from off-line schema cache 510 (2208) and if not found in cache then an additional check is done with schema access point 212 to retrieve any matching views for schema view object 608. If there was no defined view (NO at 2204) for the information object 708 then the default view is used (2206). If a view was found for the associated information object 708, it is retrieved (2208) from off-line schema cache 510 even if the schema access point 212 returned the view since client i/o manager api 210 would add the result of the request to off-line schema cache 510. Favourites are retrieved (2210) based on view is available through schema access point 212 referring to policy server 406 if favourites are defined for that view. Dynamic values in the schema are then resolved (2212) and added to the schema view by schema access point 212 calling schema access manager 404 to reference the right dynamic value provider 412. The schema view and associated favourites are then displayed (2214) to the user via 3rd party applications. When favourite selections are received from a user (YES at 2216) the dynamic values 226 are validated as dictated by policy (2226). If the user does not select favourites (NO at 2216) then pre-set defaulted values (2218) for the schema view is done in 3rd party applications 202 or user control 204. Limit values are presented 2220 by the conditionality requirements in the schema view is done once the pre-set values are added to the view since conditionality may have been evaluated based on a pre-set value.

Authentication is performed (2222) for metadata fields having an authentication trigger is done if a metadata descriptor requires authentication to evaluate. This evaluation is done through schema access point 212 by policy services 406. If the authentication was successful, then additional metadata descriptors are provided for fulfilment and value input is received (2224) for metadata fields after all required metadata descriptors are provided values and any optional metadata descriptors are provided with values. Dynamic values are validated (2226) as dictated by policy requires a call to schema access point 212 and in turn policy services 406 specifies which dynamic value providers require validation that the previously provided values are still valid. If validation is required, schema access manager 404 makes requests to dynamic value providers 412 for the latest values. If the values match then no further action is required. If they do not match then the process returns to present schema view (2214) and associated favourites along with an appropriate error message. Metadata values are stored (2228) once all the conditions are satisfied and schema client 206 calls the object i/o manager API 208 for storage of the metadata associated with 708 information object via metadata i/o plug-in manager 704 and the metadata plug-ins 706.

Figure 23:
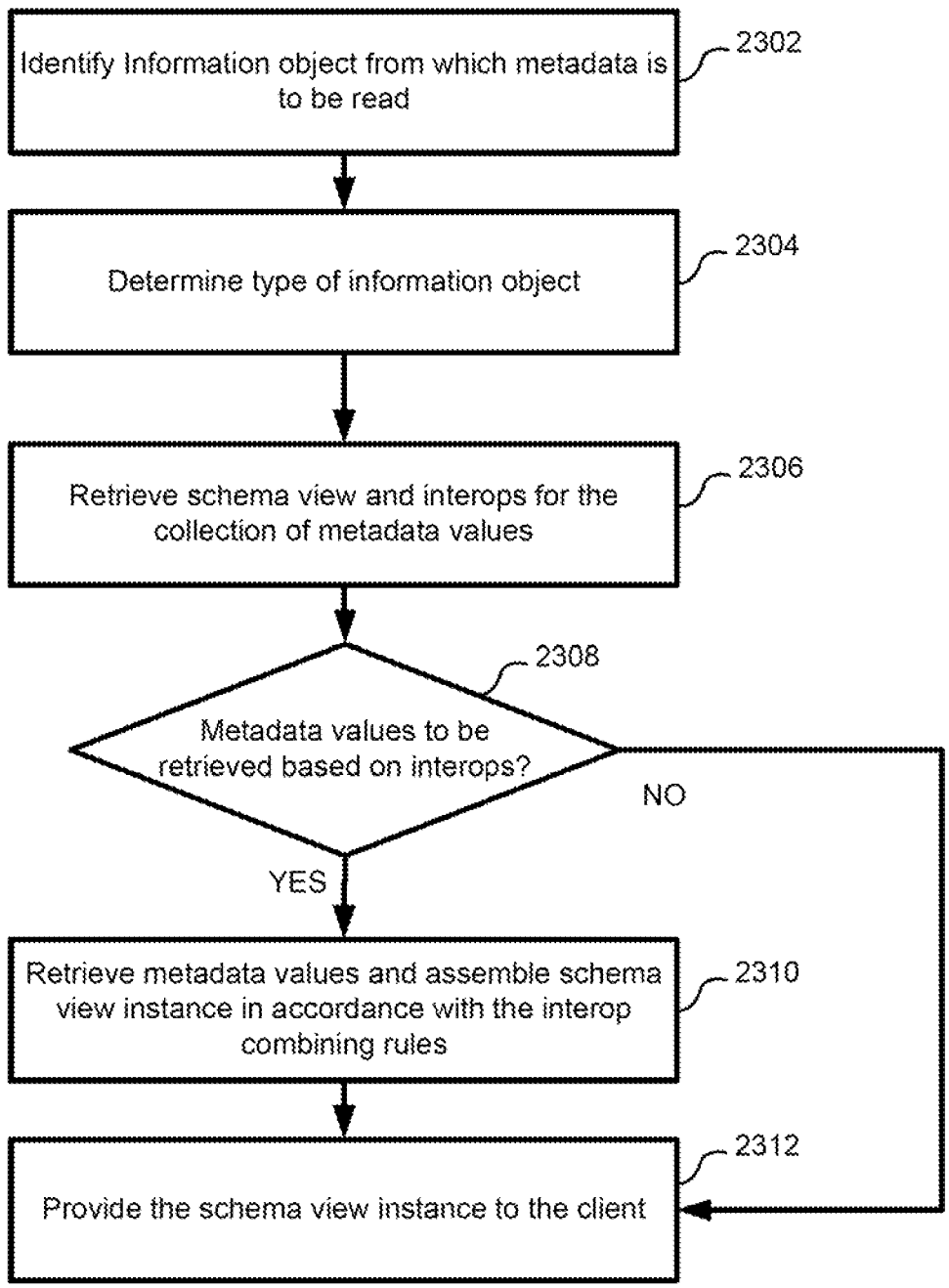
FIG. 23 is a flowchart of a method of reading metadata from an information object.

FIG. 23 is a flowchart of a method of reading metadata from an information object. The information object is identified (2302) from which metadata is to be read. The type of information object is determined (2304) through schema client 206 calling the object i/o manager 208 to access the information object 708 and passes it to schema client 206 for selection of schema view object 608. The schema view and interoperabilities are retrieved (2306) for the collection of metadata values is done by schema client 206 passing schema view object 608 to client i/o manager API 210 and requesting the view from off-line schema cache 510 and if not found in cache then an additional check is done with schema access point 212 to retrieve any matching views for schema view object 608. Any required collection and reconciling of interoperability providers is done through schema client 206. If metadata values are retrieved based on interoperabilities (YES at 2308), the values are retrieved and the schema view instance is assembled in accordance with the interoperabilities combining rules (2310) is done by schema client 206. The schema view instance is provided (2312) to the client and comes from schema client 206 to 3rd party applications API 202 or user control 204. If no metadata value are to be retrieved based on interoperabilities (NO at 2308) the schema view instance is provided to the client (2312).

Figure 24:
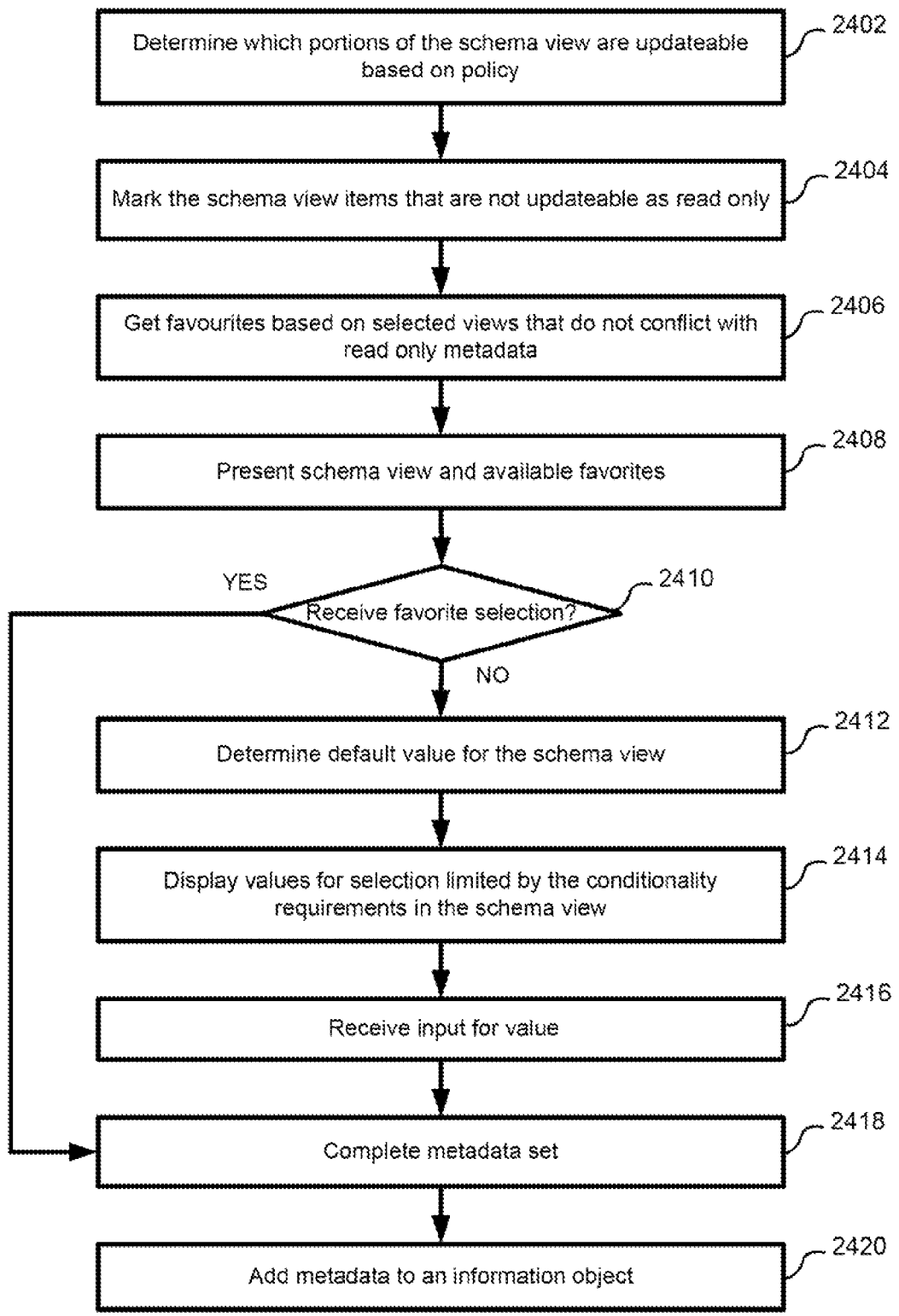
FIG. 24 is a flowchart of a method of updating metadata for an information object.

FIG. 24 is a flowchart of a method of updating metadata for an information object. Portions of the schema view that are updateable based on policy are determined (2402). The schema access point 212 requests a policy decision on the updateable portions of the view associated with the information object 708 from policy services 406. Schema view items that are not updateable are marked as read only (2404). Schema access point 212 passes the updated view through the client I/O manager API 210 to the schema client 206 and onto the requesting end client. Favourites are retrieved (2406) based on selected views that do not conflict with read only metadata is done through schema access point 212 referring to policy server 406 if favourites are defined for that view. The schema view and available favourites are displayed (2408) via 3rd party applications 802 or to 202. If favourite selections are not received (NO at 2410), the default value for the schema view is determined (2412). The values for selection limited by the conditionality requirements are displayed (2414) in the schema view via 3rd party API or user control 204. If conditionality is a requirement in the schema view, it is done once the display values for selection are added to the view since conditionality may have been evaluated based on a display values for selection. Input for values is received (2416) from 3rd party API 802 or to 202. If recent favourite selection is made by the user (YES 2410) the metadata set is completed (2418) through schema client 206. Metadata is added to the Information object 708 (2420) by schema client 206 calling the object I/O manager API 208 for storage of the metadata associated with information object 708 via metadata I/O plug-in manager 704 and the metadata plugins 706.

Figure 25:
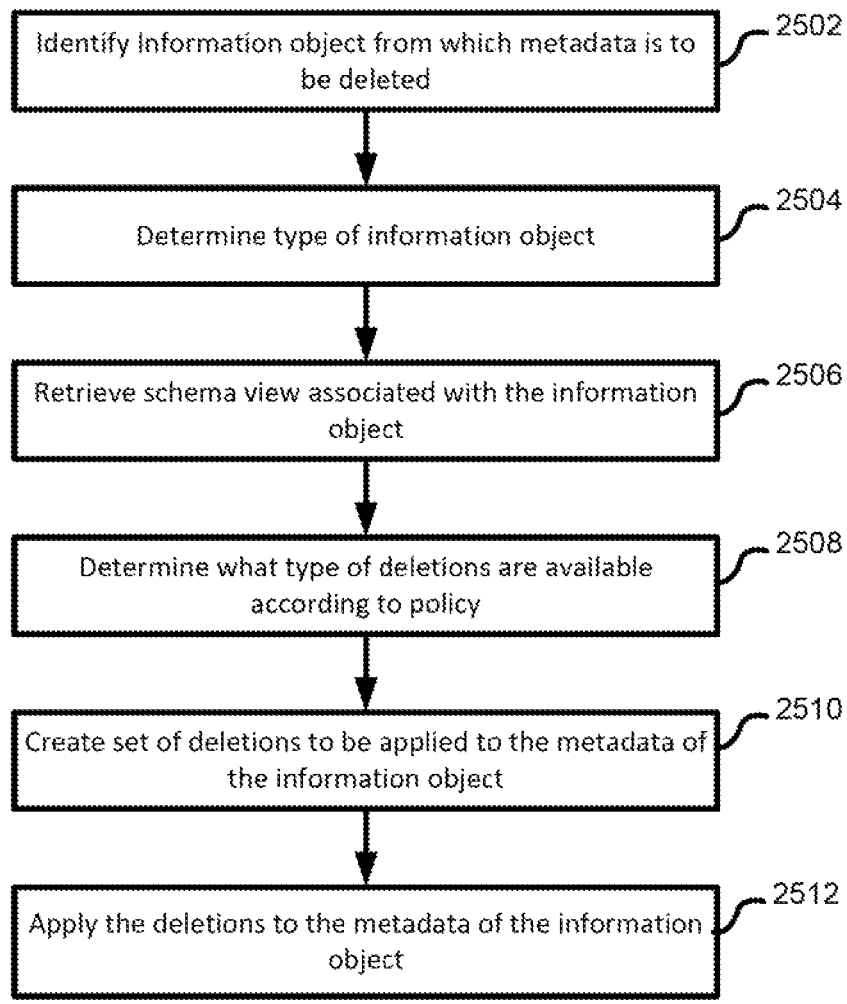
FIG. 25 is a flowchart of a method of deleting metadata from an information object.

FIG. 25 is a flowchart of a method of deleting metadata from an information object. The information object from which metadata is to be deleted is identified (2502). The type of information object is determined (2504) through schema client 206 calling the object I/O manager 208 to access the information object 708 and passes it to schema client 206 for selection of schema view object 608. The schema view associated with the information object 708 is retrieved (2506) by schema client 206 passing schema view object 608 to client I/O manager API 210 and it requesting the view from off-line schema cache 510 and if not found in cache then an additional check is done with schema access point 212 to retrieve any matching views for schema view object 608. The type of deletions are available according to policy is determined (2508). The client I/O manager API 212 makes a request to schema access 212 point for a policy server 406 decision via Schema access manager 404. A set of deletions is created (2510) to be applied to the metadata of the information object is done with schema access manager 404 creating a reducing view based on the information objects view. The reducing view is passed from schema access point 212 to client I/O manager API 210 and onto the schema client 206. The schema client 206 then reconciles the metadata reducing view with the current set of metadata values by applying the deletions to the metadata of the information object 708 (2512). Once the new set of metadata is determined, updating the metadata associated with the information object is accomplished by schema client 206 calls the object I/O manager API 208 for storage of the metadata associated with information object 708 via metadata I/O plug-in manager 704 and the metadata plug-ins 706.

More particularly, for example, each of the one or more client computing devices, server computer, schema administrator, schema access point, schema client, external entity or dynamic value providers, can be any of a general purpose device such as a computer or a special purpose device such as a client, a server, etc. Any of these general or special purpose devices can include any suitable components such as a hardware processor (which can be a microprocessor, digital signal processor, a controller, etc.), memory, communication interfaces, display controllers, input devices, etc. For example, client computing device can be implemented as a personal computer, a personal data assistant (PDA), tablet computer, a portable email device, a multimedia terminal, a mobile telephone, a set-top box, a television, etc.

In some embodiments, any suitable computer readable media can be used for storing instructions for performing the processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Although the description discloses example methods and apparatus including, among other components, software executed on hardware, it should be noted that such methods and apparatus are merely illustrative and should not be considered as limiting. For example, it is contemplated that any or all of these hardware and software components could be embodied exclusively in hardware, exclusively in software, exclusively in firmware, or in any combination of hardware, software, and/or firmware. Accordingly, while the following describes example methods and apparatus, persons having ordinary skill in the art will readily appreciate that the examples provided are not the only way to implement such methods and apparatus.

The invention claimed is:

1. A method of metadata management that is executed by a processor, the method comprising:
   determining metadata descriptors and metadata constraints of one or more types of information objects stored in a memory;
   determining a metadata schema structure definition comprising a plurality of the metadata descriptors and relationships between one or more of the plurality of the metadata descriptors and one or more of the metadata constraints, and further determining a metadata schema to be used to define metadata for the one or more types of information objects;
   determining an interoperability definition for one or more of: the plurality of the metadata descriptors; metadata values associated with the plurality of the metadata descriptors; and a serialization definition for generating an interoperability mapping based upon the one or more types of information objects and the metadata schema structure definition to enable interchange between one or more external schema formats;
   generating the metadata schema in a structured definition language comprising:
      the plurality of the metadata descriptors and the metadata values with the metadata constraints;
      the interoperability mapping; and
      one or more views, each view defining a subset of the metadata schema applicable to the one or more types of information objects; and
   storing the metadata schema to the memory,
   wherein determining the metadata schema structure definition comprises retrieving one or more schema structure definition templates, each associated with the one or more types of information objects and determined to have properties similar to the plurality of the metadata descriptors and the metadata constraints of the one or more types of information objects, the one or more schema structure definition templates adapted to create the metadata schema structure definition to map the plurality of the metadata descriptors and the metadata constraints.

2. The method of claim 1 wherein generating the metadata schema comprises validating the metadata schema against the metadata constraints, wherein the metadata constraints define logical constraints among the metadata descriptors, metadata descriptor types, and the metadata values.

3. The method of claim 1 wherein the interoperability mapping is retrieved by clients to enable bi-direction exchange of metadata and formatting of information objects that have had metadata applied to them using the metadata schema and an external entity requiring an external metadata schema format.

4. The method of claim 1 further comprising determining authentication requirements to authorize presentation of a subset of the plurality of the metadata descriptors or the metadata values to a client computing device utilizing the metadata schema by accessing an identity provider for providing access permissions associated with a user of the client computing device.

5. The method of claim 1 wherein one or more of the metadata descriptors are conditionally bound to a selection of dependent metadata descriptors and associated metadata values.

6. The method of claim 1 wherein the metadata constraints define user selections of the metadata values defined within the metadata schema.

7. The method of claim 1 wherein generating the metadata schema structure definition comprises defining a cardinality of one or more of the plurality of the metadata descriptors and the metadata values.

8. The method of claim 1 wherein the structured definition language is defined in extensible markup language (XML).

9. The method of claim 8 wherein information objects are defined as computer readable electronic data files stored in a memory.

10. The method of claim 1 wherein the schema structure definition templates are selected as providing schema structures or views which are bounded by previously predefined schema structure constraints that have a greatest degree of confidence to encompass metadata of one or more information objects.

11. The method of claim 1 wherein determining the metadata descriptors and the metadata constraints of the one or more types of information objects is performed by analyzing a subset of information objects stored in the memory.

12. The method of claim 1 wherein the metadata schema is validated against a sample population of information object types to ensure that constraints have been met, wherein if the metadata schema does not meet the constraints, the metadata schema is re-generated until an acceptable metadata schema that meets the constraints is generated.

13. The method of claim 1 wherein the metadata schema is defined by performing a best-fit of the metadata schema structure definition against the one or more schema structure definition templates.

14. The method of claim 13 wherein a best-fit metadata schema structure definition is presented with metrics identifying compliance or non-compliance of the metadata schema and information objects which do not fit the metadata schema structure definition.

15. The method of claim 1 wherein the metadata schema identifies at least one dynamic value provider associated with one of the metadata descriptors, wherein metadata values associated with the one of the metadata descriptors are provided by the dynamic value provider.

16. The method of claim 15 wherein the metadata schema enables a client using the metadata schema to retrieve a value from the at least one dynamic value provider upon processing the information object.

17. The method of claim 1 further comprising:
determining an information object type of an information object;
receiving the metadata schema in response to a request based upon the information object type;
parsing a received plurality of metadata descriptors and metadata constraints defined in the metadata schema to determine valid metadata values for the information object type;
determining metadata values to be associated with the received metadata descriptors from the information object; and
storing the determined metadata values associated with the information object.

18. The method of claim 1 wherein the generated metadata schema is partially or fully encrypted or signed.

19. The method of claim 1 wherein the interoperability mapping includes a mapping with external schema value providers.

20. A non-transitory computer-readable medium containing computer-executable instructions that, when executed by a processor, cause the processor to perform a method for metadata management, the method comprising:
determining metadata descriptors and metadata constraints of one or more types of information objects stored in a memory;
determining a metadata schema structure definition comprising a plurality of the metadata descriptors and relationships between one or more of the plurality of the metadata descriptors and one or more of the metadata constraints, and further determining a metadata schema to be used to define metadata for the one or more types of information objects;
determining an interoperability definition for one or more of: the plurality of the metadata descriptors; metadata values associated with the plurality of the metadata descriptors; and a serialization definition for generating an interoperability mapping based upon the one or more types of information objects and the metadata schema structure definition to enable interchange between one or more external schema formats;
generating the metadata schema in a structured definition language comprising:
the plurality of the metadata descriptors and the metadata values with the metadata constraints;
the interoperability mapping; and
one or more views, each view defining a subset of the metadata schema applicable to the one or more types of information objects; and
storing the metadata schema to the memory,
wherein determining the metadata schema structure definition comprises retrieving one or more schema structure definition templates, each associated with the one or more types of information objects and determined to have properties similar to the plurality of the metadata descriptors and the metadata constraints of the one or more types of information objects, the one or more schema structure definition templates adapted to create the metadata schema structure definition to map the plurality of the metadata descriptors and the metadata constraints.

21. A method of metadata management stored in a non-transitory computer readable memory, the method executed by a processor coupled to the memory, the method comprising:
determining an information object type of an information object;

receiving a metadata schema in response to a request based upon the determined information object type, the metadata schema comprising:
- a plurality of metadata descriptors and metadata constraints associated with the determined information object;
- an interoperability mapping based upon the information object type and a metadata structure definition to enable interchange between one or more external schema formats; and
- one or more views, each of the one or more views defining a subset of the metadata schema applicable to the determined information object type;

parsing the received plurality of metadata descriptors, the received metadata constraints, the received interoperability mapping and the received one or more views included in the metadata schema to determine valid metadata values for the information object type;

determining interoperability parameters associated with the information object type, the interoperability parameters determined from the interoperability mapping providing a mapping of metadata values, metadata descriptors and structure between the metadata schema and an external entity;

determining metadata values to be associated with the received plurality of metadata descriptors from the determined information object and in conformity with the metadata schema and the interoperability parameters; and storing the determined metadata values for the information object.

22. The method of claim 21 further comprising:
retrieving a policy document associated with the metadata schema; and
determining interoperability rules from the policy document for determining which one or more of a plurality of differing values are to be selected from the external entity to be associated with the metadata descriptors.

23. The method of claim 21 wherein the interoperability parameters define a data storage location for storing the metadata values.

24. The method of claim 22 wherein if there are multiple interoperability rules and multiple metadata values, the interoperability rules and the metadata values associated with an external entity that is validly signed are authoritative for selecting metadata values from the multiple metadata values to be associated with a metadata descriptor.

25. The method of claim 24 wherein, when the multiple interoperability rules provide valid values from a plurality of valid signed external entities, a metadata value for each of the interoperability rules is weighted based upon one or more signature characteristics associated with the respective external entity to select a metadata value to be associated with a metadata descriptor.

26. The method of claim 21 wherein the metadata schema further defines one or more relationships between multiple metadata names and multiple metadata values.

27. The method of claim 21 wherein determining interoperability parameters comprises:
validating determined metadata values by associated ranges and constraints defined in the metadata schema.

28. The method of claim 21 wherein the metadata schema further defines one or more conditional relationships and associated ranges.

29. The method of claim 21 further comprising authenticating a user by a defined authentication method for any metadata descriptors and/or values that require authorization for modification or viewing by the user.

30. The method of claim 21 wherein determining metadata values from the information object comprises retrieving stored metadata associated with the information object and formatting the retrieved metadata to the metadata schema.

31. The method of claim 21 wherein determining metadata values comprises communicating with a dynamic value provider identified in the metadata schema or associated with the information object and receiving a value to be associated with the plurality of metadata descriptors.

32. The method of claim 21 wherein determining metadata values comprises determining values based on metadata values derived from content of the information object or a context of how the information object is stored.

33. The method of claim 21 further comprising determining a language to display for the metadata descriptors and the metadata values based on a determined language of a consuming client computing device.

34. The method of claim 21 wherein the received metadata schema is partially or fully encrypted or signed.

35. The method of claim 21 wherein the interoperability mapping includes a mapping with external schema value providers.

36. A non-transitory computer-readable medium containing computer-executable instructions that, when executed by a processor, cause the processor to perform a method for metadata management, the method comprising:
determining an information object type of an information object;
receiving a metadata schema in response to a request based upon the determined information object type, the metadata schema comprising:
- a plurality of metadata descriptors and metadata constraints associated with the determined information object type;
- interoperability mappings based upon the information object type of the information object and a metadata structure definition to enable interchange between one or more external schema formats; and
- one or more views, each of the one or more views defining a subset of the metadata schema applicable to the determined information object type;

parsing the received plurality of metadata descriptors, the received metadata constraints, the received interoperability mappings and the received one or more views included in the metadata schema to determine valid metadata values for the information object type;

determining interoperability parameters associated with the information object type, the interoperability parameters determined from the interoperability mappings providing a mapping of metadata values, metadata descriptors and structure between the metadata schema and an external entity;

determining metadata values to be associated with the received plurality of metadata descriptors from the determined information object and in conformity with the metadata schema and the interoperability parameters; and storing the determined metadata values for the information object.

37. A method of metadata management at a schema access point executed by a processor, the method comprising:
receiving a request from a client computing device identifying an information object type;

determining an identity associated with the client computing device and associated security and configuration parameters;

determining applicable metadata schema in a structured definition language for the information object type from a plurality of metadata schema and the determined identity, the applicable metadata schema comprising;

a plurality of metadata descriptors and metadata constraints associated with an information object of the information object type;

interoperability mappings based upon the information object type and a metadata structure definition to enable interchange between one or more external schema formats; and one or more views, each of the one or more views defining a subset of the metadata schema applicable to the information object type;

generating a client metadata schema using the applicable metadata schema; and sending the client metadata schema to the client computing device for application of the client metadata schema to information objects of the information object type.

38. The method of claim 37 further comprising modifying the interoperability mappings included in the applicable metadata schema based upon the identity associated with the client computing device and enabling a bi-direction exchange of metadata and formatting of the information object between the applicable metadata schema and an external entity.

39. The method of claim 37 wherein, when the interoperability mappings define valid values from a plurality of valid signed sources, the value for each of the interoperability mappings is weighted based upon one or more signature characteristics to select a value to be associated with a metadata descriptor.

40. The method of claim 37 wherein the structured definition language is defined in extensible markup language (XML).

41. The method of claim 37 further comprising determining authentication requirements to authorize presentation of a subset of the plurality of metadata descriptors or metadata values to a client computing device utilizing the generated metadata schema by accessing an identity provider for providing access permissions associated with a user of the client computing device.

42. The method of claim 37 wherein one or more of the plurality of metadata descriptors are defined in the metadata structure definition as being conditionally bound to a selection of dependent metadata descriptors and associated values.

43. The method of claim 41 wherein determining the authentication requirements comprises:

retrieving a policy decision associated with the generated metadata schema and the identity of the client computing device; and determining metadata descriptors or metadata values to be provided in compliance with the policy decision to the client computing device.

44. The method of claim 43 further comprising determining interoperability rules from the policy decision for determining which of a plurality of differing values are to be selected from an external entity to be associated with the metadata descriptors.

45. The method of claim 37 further comprising determining a location of a dynamic value provider and modifying the metadata schema to identify the location.

46. The method of claim 37 further comprising determining a location of a dynamic value provider and modifying the metadata schema to identify a value provided by the dynamic value provider.

47. The method of claim 37 wherein determining the identity associated with the client computing device is performed through a directory service coupled to the schema access point.

48. The method of claim 37 wherein the generated client metadata schema is partially or fully encrypted or signed.

49. The method of claim 37 wherein at least one of the interoperability mappings includes a mapping with external schema value providers.

50. A non-transitory computer-readable medium containing computer-executable instructions that, when executed by a processor, cause the processor to perform a method for metadata management at a schema access point, the method comprising:

receiving a request from a client computing device identifying an information object type;

determining an identity associated with the client computing device;

determining applicable metadata schema in a structured definition language for the information object type from a plurality of metadata schema and the determined identity;

generating a client metadata schema using the applicable metadata schema, the client metadata schema comprising;

a plurality of metadata descriptors and metadata constraints associated with an information object of the information object type;

interoperability mappings based upon the information object type and a metadata structure definition to enable interchange between one or more external schema formats; and one or more views, each of the one or more views defining a subset of the metadata schema applicable to the information object type; and sending the client metadata schema to the client computing device for application of the client metadata schema to information objects of the information object type.

* * * * *